(12) United States Patent
Felisari et al.

(10) Patent No.: US 11,912,840 B2
(45) Date of Patent: Feb. 27, 2024

(54) COMPOSITION CONTAINING GRAPHENE AND GRAPHENE NANOPLATELETS AND PREPARATION PROCESS THEREOF

(71) Applicant: VERSALIS S.P.A., San Donato Milanese (IT)

(72) Inventors: Riccardo Felisari, S. Giorgio di Mantova (IT); Viviana Autieri, Pellezzano (IT)

(73) Assignee: VERSALIS S.P.A., San Donato Milanese (IT)

( * ) Notice: Subject to any disclaimer, the term of this patent is extended or adjusted under 35 U.S.C. 154(b) by 0 days.

(21) Appl. No.: 16/072,383

(22) PCT Filed: Jan. 26, 2017

(86) PCT No.: PCT/IB2017/050420
§ 371 (c)(1),
(2) Date: Jul. 24, 2018

(87) PCT Pub. No.: WO2017/130136
PCT Pub. Date: Aug. 3, 2017

(65) Prior Publication Data
US 2019/0031852 A1 Jan. 31, 2019

(30) Foreign Application Priority Data
Jan. 27, 2016 (IT) ........................ 102016000008311

(51) Int. Cl.
| | | |
|---|---|---|
| *C08J 9/00* | (2006.01) | |
| *C08J 9/14* | (2006.01) | |
| *C08K 3/04* | (2006.01) | |
| *C01B 32/19* | (2017.01) | |
| *C08F 12/08* | (2006.01) | |
| *C08F 2/44* | (2006.01) | |
| *C08F 112/08* | (2006.01) | |
| *B82Y 30/00* | (2011.01) | |

(52) U.S. Cl.
CPC ............ *C08J 9/0071* (2013.01); *C01B 32/19* (2017.08); *C08F 2/44* (2013.01); *C08F 12/08* (2013.01); *C08F 112/08* (2013.01); *C08J 9/141* (2013.01); *C08K 3/042* (2017.05); *B82Y 30/00* (2013.01); *C08J 2203/14* (2013.01); *C08J 2203/182* (2013.01); *C08J 2325/04* (2013.01); *C08J 2325/06* (2013.01)

(58) Field of Classification Search
CPC .................................................... C08J 9/0071
See application file for complete search history.

(56) References Cited

U.S. PATENT DOCUMENTS

| | | | | |
|---|---|---|---|---|
| 9,789,366 | B1 * | 10/2017 | Chavan ............. | A63B 37/0043 |
| 2009/0022649 | A1 | 1/2009 | Zhamu et al. | |
| 2012/0264836 | A1 | 10/2012 | Felisari et al. | |
| 2012/0270960 | A1 * | 10/2012 | Felisari ................ | C01B 32/192 |
| | | | | 521/90 |
| 2013/0034709 | A1 * | 2/2013 | Takahashi ................ | C08K 3/04 |
| | | | | 524/495 |
| 2013/0296498 | A1 * | 11/2013 | Nakasuga ............. | C01B 32/225 |
| | | | | 525/330.3 |
| 2015/0175778 | A1 * | 6/2015 | Nozato ................. | C08L 101/00 |
| | | | | 523/218 |
| 2016/0152748 | A1 * | 6/2016 | Goffredi ............... | C08F 212/08 |
| | | | | 526/272 |

FOREIGN PATENT DOCUMENTS

| | | |
|---|---|---|
| RU | 2 476 456 | 6/2011 |
| RU | 2 537 311 | 11/2013 |
| RU | 2 552 477 | 12/2013 |
| WO | 9 851 735 | 11/1998 |
| WO | 2008/045778 | 4/2008 |
| WO | WO 2011/042800 A1 | 4/2011 |
| WO | WO 2011/055198 A1 | 5/2011 |

OTHER PUBLICATIONS

Xu et al., J. Am. Chem. Soc. 2011, 133,9148-9151 (Year: 2011).*
Surface tension values, flyer (Year: NA).*
International Search Report and Written Opinion dated May 29, 2017 in PCT/IB2017/050420, 11 pages.
Acceptance of Decision as received in Russian Patent Application No. 2018129141/04 dated Feb. 2, 2021 w/English Translation.
Office Action as received in the corresponding EP Patent Application No. 17711316.4, 5 pages.

* cited by examiner

*Primary Examiner* — Irina Krylova
(74) *Attorney, Agent, or Firm* — Oblon, McClelland, Maier & Neustadt, L.L.P.

(57) ABSTRACT

The present invention relates to a composition containing graphene and graphene nanoplatelets durably dispersed in a solvent. Said composition is characterized in that it contains at least 1% by weight, with respect to the total weight of the solvent, of a vinyl aromatic polymer and comprises a mass concentration of graphene and graphene nanoplatelets (GRS) ranging from 0.001% to 10% by weight with respect to the total weight of the solvent. The vinyl aromatic polymer present in the composition is obtained by partial or total polymerization of the relative vinyl aromatic monomer alone or mixed with up to 50% by weight of further copolymerizable monomers. The composition must satisfy the condition that the sum of the possible content of non-reacted monomers and the content of vinyl aromatic polymer formed is equal to at least 10% by weight with respect to the total weight of the solvent.

4 Claims, 10 Drawing Sheets

COMPOSITION CONTAINING GRAPHENE AND GRAPHENE NANOPLATELETS AND PREPARATION PROCESS THEREOF

The present invention relates to a composition containing graphene and graphene nanoplatelets durably dispersed in a solvent, and a process for the preparation of said composition containing graphene and graphene nanoplatelets durably dispersed in a solvent, starting from graphite material and with the use of an ultrasound technique.

In the present text, a composition containing graphene and graphene nanoplatelets dispersed in a solvent refers to a stable dispersion of graphene and graphene nanoplatelets, wherein no formation of deposits or separated phases in the solvent is observed.

Graphite material refers to a material essentially consisting of graphitic carbon as defined by IUPAC in the text "Recommended Terminology for the Description of Carbon as a Solid" (IUPAC Recommendations, 1995).

In addition to the graphite material, non-graphitic carbon can also be present, such as, for example, carbon black, as starting material for preparing the composition described and claimed in the present patent application.

The process object of the present invention allows compositions containing graphene and graphene nanoplatelets to be obtained, having a high exfoliation degree, until a monoatomic layer is obtained in the case of graphene, or a limited number of layers in the case of graphene nanoplatelets.

The term exfoliation refers to the process through which the layers of a multilayer material (such as the graphite material used in the present invention) are separated from each other ("Definitions of terms relating to the structure and processing of sols, gels, networks, and inorganic-organic hybrid materials" IUPAC Recommendations 2007).

The compositions containing graphene and graphene nanoplatelets dispersed in a solvent described and claimed in the present patent application can be used for the preparation of:
  polymer composites or polymer nanocomposites or master-batches, the latter also known as concentrated polymer composites, containing graphene and graphene nanoplatelets; these compounds having high mechanical performances, a high thermal resistance, antistatic capabilities, electromagnetic insulation properties, or having a high thermal conductivity:
  expandable polymer composites or expandable polymer nanocomposites from which articles and expanded polymeric foams having a high thermal insulation capacity, thermal resistance and high mechanical performances, can be prepared;
  graphene and graphene nanoplatelets, in solid form, deriving from the compositions described and claimed and obtained through the process described and claimed.

The products indicated above are used as intermediate products in subsequent processes. In particular, the graphene and graphene nanoplatelets so obtained, and the relative compositions or dispersions, having a high purity, can be used for electronic applications.

A polymer nanocomposite is defined as a composite wherein at least one of the phase domains has at least one dimension in the order of nanometers.

The Applicant also intends to protect polymer composites, or polymer nanocomposites, also expandable, wherein the polymer is of the vinyl aromatic type; said composites can be obtained starting from the polymeric composition described and claimed in the present text.

Said polymer composites or polymer nanocomposites, possibly expandable, can be used for preparing polymer granules, manufactured products or expanded polymer articles, expanded polymeric foams having a high thermal insulation capacity, thermal resistance and high mechanic performances, and these are also object of the present invention.

In the present text, the term "GRS" refers to graphene and graphene nanoplatelets.

In the present text, the term "graphene and graphene nanoplatelets" refers to graphene, or graphene nanoplatelets, or both.

In the present text, the term "solvent" refers to the fluid phase in which graphene and graphene nanoplatelets are dispersed, with no reference to possible dissolving properties of the constituents.

In the present text the term "liquid phase" also refers to the composition comprising the liquid phase and the solid particulate (e.g. the graphene nanoplatelets) dispersed therein.

For the purposes of the present invention, all the operative conditions indicated in the text should be considered as being preferred conditions even if not expressly specified.

For the purposes of the present invention, the term "to comprise" or "to include" also comprises the term "to consist in" or "essentially consisting of".

For the purpose of the present invention, the definitions of the ranges always include the extremes unless otherwise specified.

Graphene is a monoatomic layer of carbon atoms, $sp^2$ hybridized, organized according to a crystalline structure with hexagonal cells. This basic structure has a planar conformation and consequently the monoatomic layer appears as a two-dimension material. It represents the basic structure of all allotropic graphite forms of carbon: graphite, in fact, consists of graphene sheets stacked on each other and separated by 3.37 Å; fullerenes can be seen as the coiling of a section of the graphene sheet, whereas carbon nanotubes can be obtained by rolling the graphene sheet up on itself. For over 60 years it was believed that this type of material could not exist in an isolated state as it was thermodynamically unstable with respect to the formation of curved structures such as fullerenes or nanotubes. It was isolated for the first time in 2004 by two Russian researchers A. K. Geim and K. S. Novoselov. Due to the particular geometry of the system and electronic configuration of carbon, graphene has a very specific electronic band structure, with exceptional mechanical, and also electronic, characteristics. With a Young modulus equal to 1 TPa and a tensile strength equal to 130 GPa, graphene is the most resistant material so far measured. Furthermore, it has a thermal conductivity of 5,000 W/mK and electrical resistivity of $4·10^{-5}$ Ohm·cm. In addition to its remarkable mechanical, thermal and electric properties, graphene also has exceptional optical properties: in fact even if the graphene sheet has a thickness equal to that of a single atom, it is capable of absorbing a significant fraction, equal to 2.3% of the incident light. It has also been observed that the absorption is independent of the wave length A (from UV to near infrared) and increases with an increase in the number of layers; in practice, each sheet of graphene adds a further 2.3% of absorption (consequently 2 sheets of graphene absorb 4.6% of the incident light).

Various methods for the production of graphene have been developed since its discovery, but the greatest challenge is to obtain high quality samples, through a method that can be scalable. The performances of the material, in fact, depend on the number of layers present in addition to the overall quality of the crystalline lattice (Honeycomb Carbon: A Review of Graphene; Matthew J. Allen, Vincent C. Tung, and Richard B. Kaner; Chem. Rev. 2010, 110, 132-145).

The production methods of graphene can be classified in two macro categories: bottom-up methods and top-down methods.

Various methods belong to the first category, such as CVD (chemical vapour deposition), epitaxial growth on SiC, arc discharge, unzipping of carbon nanotubes. These methods allow single-layer graphene to be obtained, or double-layer or with a few layers, with a high purity and high side dimensions, but they are expensive and on a small scale and are therefore unsuitable for the production of polymer nanocomposites. US 2011/244661, for example, describes a method for obtaining nanoribbons (strips having a width in the order of nm) of graphene by the unzipping of carbon nanotubes. The method consists in partially oxidizing carbon nanotubes, dispersing them in an organic solvent and subjecting the solution to mechanical stirring so as to open the nanotubes.

Top-down methods consist in the production of graphene and modified graphene, through exfoliation of graphite or its derivatives (such as graphite oxide, for example). These methods are certainly more advantageous from an economic point of view, with respect to bottom-up methods, as graphite is a mineral which is widespread in nature and easily extractable, and consequently has a low cost (Graphene/Polymer Nanocomposites; Hyunwoo Kim, Ahmed A. Abdala, and Christopher W. Macosko; Macromolecules 2010, 43, 6515-6530; Graphene based materials: Past, present and future; Virendra Singh, Daeha Joung, Lei Zhai, Soumen Das, Saiful I. Khondaker, Sudipta Seal; Prog. Mat. Sci 56, 2011, 1178-1271).

Another method for the production of graphene on a large scale is based on the exfoliation and reduction of graphite oxide. The latter is obtained through the methods of Staudenmaier or Hummers (and variations thereof) by oxidizing graphite with $KMnO_4$, $KClO_3$ and $NaNO_3$ in the presence of nitric or sulfuric acid (Staudenmaier, L. Ber. Dtsch. Chem. Ges. 1898, 31, 1481-87; Hummers, W. S., Jr., Offerman, R. E. J. Am. Chem. Soc. 1958, 80, 1339).

With respect to graphite as such, the oxide has hydroxyl and epoxy groups on the $sp^3$ hybridized carbons of the base plane, in addition to carbonyl and carboxyl groups, positioned at the edges of the layers on the $sp^2$ hybridized carbons. Graphite oxide is therefore highly hydrophilic and can be easily exfoliated in water, furthermore, the distance between the layers is greater with respect to that existing between the graphite layers (about 0.34 nm of graphite against 0.6-1 nm of the oxide) due to the shifting of the $sp^3$ carbons above and below the original base plane and the presence of oxygen atoms bound with covalent bonds.

The presence of functional groups provides reactive sites for various reactions of surface modification to develop functionalized graphite oxide.

The main drawback of this method is that the functional groups present destroy the conjugated electronic structure of graphene, introducing defects and disorders. The optical and electric properties, which strongly depend on the space distribution of the functional groups and on the structural defects, are strongly affected, graphite oxide is in fact electrically insulating and thermally unstable.

Furthermore, the optical properties are also completely different from graphene. In particular, graphite oxide loses its property of being an infrared-ray absorber, regardless of the wavelength, and this nullifies its use for increasing the thermal insulation in the expanded polymeric foams.

The topological defects introduced can be classified as isolated (presence of pentagons and heptagons instead of the hexagonal cells) and extensive (almost amorphous carbon structures).

The reduction of graphite oxide, either chemically or thermally, can restore the conductivity (electrical and optical), but only partially, to values which are in any case lower by orders of magnitude with respect to pure graphene. The oxide reduction, in fact, is not complete and a significant content of oxygen, as also defects and disorders, remains inside the structure.

Following the reduction, the network of $sp^2$ carbons in the oxidized areas is restored, but the crystallinity of the graphite originally used, is in any case lost. In particular, the presence of carbon atoms with a $sp^3$ hybridization, strongly limits the electronic capabilities and interaction with the infrared light of the graphene thus produced. The disordered regions subjected to reduction, moreover, introduce stress and deformations both inside and outside the base plane.

The chemical reduction takes place with the use of various reducing agents (such as, for example, hydrazine, sodium borohydride), but the dangerous nature and cost of the chemical agents used can limit their applications.

Another method for obtaining the reduction of graphite oxide is through rapid heating to high temperatures. The material is heated to temperatures in the order of 1,000° C. for a few seconds in an inert environment; in this way, both reduction and exfoliation are obtained. During the decomposition of the epoxy and hydroxyl groups, in fact, $CO_2$ develops and when the pressure generated by the gas overcomes the Van der Waals forces that keep the layers together, exfoliation occurs.

Thermal reduction has the advantage of not requiring the use of solvents, but, due to the structural defects caused by the loss of $CO_2$, the layers are highly wrinkled and folded on themselves.

WO 2012/166001 describes a method for producing graphene through treatment of graphite with sulfuric acid, followed by oxidation with potassium permanganate and finally reduction of the oxides with alcohols.

Analogously, CN 103408000 describes a method for preparing graphite oxide with large side dimensions and large surface area. Also in this case, the natural graphite is treated with nitric and sulfuric acids and is subsequently oxidized using a strong oxidizing agent (hydrogen peroxide).

As indicated above, the graphite oxide obtained through the processes described in the above-mentioned patents is a material characterized by the presence of structural defects and which, even if reduced, does not recover the crystalline structure of the starting graphite material. In addition, the methods claimed in these patents envisage the use of chemical agents which are often corrosive and environmental friendly (such as strong acids and oxidants); the industrialization results consequently complex and expensive.

Mechanical exfoliation of graphite is the method with which single-layer graphene was isolated for the first time. The method, which cannot be used on an industrial scale, consists of the use of adhesive tape for separating the layers of graphite, and allows high-quality graphene to be obtained, with large side dimensions but in very reduced quantities.

The direct exfoliation of graphite can be obtained in liquid phase through ultrasound treatment in suitable solvents. This method has various advantages: it is potentially easily scalable, consequently it can possibly produce single-layer graphene or with a few layers, possibly functionalized, in industrial amounts. The drawbacks normally present in this production mode can be summarized as follows: low yield and difficulty in separating or extracting the graphene sheets or graphene nanoplatelets from the solution. In particular, extraction by filtration or centrifugation implies a certain degree of stacking and re-assembly of the graphene layers, thus reducing the effectiveness of the method. Furthermore, an excessively intensive treatment with ultrasounds can result in an excessive reduction of the side dimensions of the layers, causing a reduction in the aspect ratio (ratio between the side dimension and the thickness).

The choice of the solvent is fundamental as, in order to obtain a good dispersion and exfoliation of the graphite, the interfacial tension between the solvent and graphite material must be minimized ("High-yield production of graphene by liquid-phase exfoliation of graphite", Hernandez Y., Nicolosi V., Lotya M., Blighe F. M., Sun Z., De S., Mc Govern I. T., Holland B., Byrne M., Gun'ko Y. K., Boland J. J., Niraj P., Duesberg G., Krishnamurthy S., Goodhue R., Hutchison J., Scardaci V., Ferrari A. C. and Coleman J. N., Nature Nanotechnoly 2008, 3, 563-568). If the interfacial tension is high, in fact, the graphite particles will tend to adhere to each other and therefore the energy per surface unit required for separating two adjacent layers will be higher. Ideal solvents for the dispersion of graphite are those with an interfacial tension of about 40 $mJ/m^2$, such as, for example, N-methyl-pyrrolidone, dimethylformamide and ortho-dichlorobenzene.

In the above-mentioned article of Hernandez et al. "High-yield production of graphene by liquid-phase exfoliation of graphite", the authors obtained a dispersion of graphene with concentrations of up to 0.01 mg/ml in N-methyl-pyrrolidone (NMP) starting from graphite, obtaining non-oxidized graphene and without the presence of defects, with a yield of single-layer graphene of about 1% by weight.

The solvent used (NMP), however, has numerous drawbacks: in addition to being toxic, irritating and teratogenic, it also has a high boiling point (203° C.) which limits its handling and applications above all in the electronics field, where the complete removal of the solvent is required, which could otherwise affect the performance.

CN 103466612 describes a method for obtaining graphene starting from graphite and using two or more components at different ultrasound frequencies, ranging from 20 and 1,000 kHz. Water and alcohols are used as solvents, but also solutions of inorganic acids, aldehydes, ketones, liquid alkanes or combinations thereof.

WO 2013/010211 describes a method for exfoliating a laminar material (therefore not necessarily graphene) through ultrasound treatment in a suitable surfactant.

CN 103112848 describes a process for preparing graphene which comprises the dispersion of graphite in an acidic aqueous solution of chitosan through ultrasound treatment for 0.5-50 hours.

The dispersion is then left to decant and the supernatant is centrifuged so as to recover the exfoliated material with the lowest number of layers.

KR 20110077606 comprises the sonication treatment of graphite in propanol for 10-20 minutes and subsequent centrifugation at 4,500-5,500 rpm to eliminate the non-exfoliated graphite particles.

In order to obtain the exfoliation of graphite, it is possible to resort a preliminary passage consisting in the intercalation treatment.

The graphite is treated with suitable substances which are positioned between the layers giving rise to so-called Graphite Intercalation Compounds (GICs). The method typically used for intercalation comprises dispersion of the graphite in nitric acid, sulfuric acid or a mixture of both, but other substances such as potassium chlorate, chromic acid, potassium permanganate, perchloric acid, are also often used. The intercalated graphite is subsequently subjected to rapid heating to high temperatures (700-1000° C.) during which the particles expand their original volume up to 80-1,000 times, acquiring a particular accordion structure in the direction perpendicular to the crystalline layers of the graphite.

This method is described in various documents, such as US 2010/140792 and WO 2011/162727 which, downstream of the intercalation, considers, for the separation of the layers, the use of processes of electrochemical, thermal, acoustic nature, microwaves and ultrasounds.

WO 2008/060703 describes a process for the production of nanostructures (nanotubes, fullerenes and graphene nanoplatelets) by intercalating graphite with formic or acetic acid, water or a combination thereof, subsequent exposure of the intercalated compound to a supercritical fluid and thermal exfoliation at a temperature of at least 1,450° C., feeding the intercalated graphite into a plasma of inert gas.

A disadvantage of the intercalation process is represented by the use of environmental friendly substances; furthermore, the process produces various species of sulfuric and nitric compounds in both liquid and gaseous phase and this requires a clean-up treatment. A further disadvantage of intercalation is that, with this process, it is difficult to control the exfoliation degree and it cannot be used for producing graphene nanoplatelets having only a few layers.

In the article "High concentration few-layer graphene sheets obtained by liquid phase exfoliation of graphite in ionic liquid" (Nuvoli D., Valentini L., Alzari V., Scognamillo S., Bittolo Bon S., Piccinini M., Illescas J. and Mariani A.; J. Mater. Chem., 2011, 21, 3428-3431), the authors proposed ultrasound treatment of graphite in an ionic liquid (1-ethyl-3-methyl-imidazole hexafluorophosphate, HMIH). Even if a concentration of 5.33 mg/ml was obtained, the presence of particles having a thickness of 2 nm was verified, demonstrating a low exfoliation yield.

KR 20130068515 also describes a method for producing graphene using ionic liquids, by subjecting a mixture of ionic liquids containing fluorine and graphite material to ultrasounds, and subsequently to microwaves and then again to ultrasounds.

In the article "Preparation of Graphene by Using an Intense Cavitation Field in a Pressurized Ultrasonic Reactor" (Stengl V.; Chem. Eur. J. 2012, 18, 14047-14054), the authors presented a method for producing high-quality and non-oxidized graphene starting from natural graphite, using cavitation in a pressurized ultrasound reactor. The graphite was added to a mixture of water and ethylene glycol (in a ratio of 9:1) and subjected to cavitation for 50 minutes. The cavitation was carried out in an ultrasound reactor at a pressure of 5 bar and with an intensity of over 300 $W/cm^2$ transferred to the liquid.

WO 2011/014347 describes a method for exfoliating graphite material to produce graphene nanoplatelets, which consists in dispersing the graphite material in a liquid medium which shows, upon contact with the graphite, a contact angle lower than 90°, and treating the suspension obtained with ultrasounds.

The method can also comprise the further addition, in a subsequent step, of a monomer or polymer to the suspension of graphene nanoplatelets in a solvent, obtaining a nanocomposite precursor that can be converted into a solid by removing the solvent or polymerizing the monomer.

In all cases, these methods do not allow a polymeric composite comprising graphene or graphene nanoplatelets to be obtained, or in any case not in a single step. The extraction of graphene or nanoplatelets from the solution is a delicate operation, which can easily induce agglomeration of the same, thus reducing the effectiveness of the treatment. Furthermore, as it requires the use of solvents, surfactants and other chemical agents, there can be a significant environmental impact, making the operation lengthy, expensive and complex.

Another factor which characterizes the methods described above and which distinguishes them from the method described in the present invention, is the actual sonication time which, in all cases, is greater than that used in the present invention.

In the article "*Sonochemical Preparation of Functionalized Graphenes*" (Hangxun Xu and Kenneth S. Suslick; *J. Am. Chem. Soc.* 2011, 133, 9148-9151), the authors proposed a single-step method for the preparation of graphene functionalized with styrene starting from graphite (natural) in the form of particles. The method provides that the natural graphite be mixed with styrene and that this mixture be irradiated with high-intensity ultrasounds; the ultrasound treatment is performed by means of a probe at a frequency of 20 kHz and an intensity of 50 W/cm$^2$ at 0° C. for two hours, in a flow of Argon. This method allows to obtain the exfoliation of graphite into a single-layer graphene or graphene with a few layers, typically less than 5, and, contemporaneously, the polymerization of styrene and the functionalization of graphene with the polystyrene chains formed.

Consequently, at the end of the method, a functionalized graphene is obtained, wherein the polystyrene chains are absorbed on the surface of the graphene. The article, in fact, explains that during sonication under the conditions indicated, the styrene polymerizes forming reactive radicals, whereas the 3D structure of the graphite is destroyed forming the 2D structure of graphene. At this point, the reactive radicals bind to the surface of the graphene thus forming graphene functionalized with polystyrene. The article also asserts that the functionalized graphenes obtained are stable and soluble in common organic solvents and can be used for preparing materials based on said graphenes.

Unlike the method described in the article of Suslick et al., the method according to the present invention allows the production of a polymeric nanocomposite obtained by exfoliation of the graphite material and the contemporaneous polymerization of the solvent.

The article of Suslick et al. does not refer to the polymerization capacity of the system proposed. In any case, a skilled person in the art would consider that, under the conditions used, it would be quite difficult to obtain a significant amount of polymer, and therefore polymeric compound.

The conditions used by Suslick et al. are different from those used in the process described and claimed in the present patent application, as will appear evident further on in the text. With respect to the conditions used in the article of Suslik et al., in fact, the process according to the present invention is carried out with a shorter sonication time, the sonication is effected at a higher pressure, in a degassed environment and typically at a much higher temperature. The Applicant would like to point out once again that the process according to the present invention is carried out in the absence of a gaseous phase during the sonication, whereas according to Suslik et al. the sonication is effected in the presence of Argon: to be able to conduct the process described and claimed in the present patent application, the small amount of gas which is normally dissolved in the solvent used, is also preferably removed.

In order to have a better understanding of the inventive scope of the invention described and claimed, the Applicant would like to discuss two articles that deal with the polymerization of styrene when subjected to sonication.

In the article "*Polymerization of Styrene Initiated by Ultrasonic Cavitation*" (P. Kruus, D. McDonald, and T. J. Patraboy; *J. Phys. Chem.* 1987, 91, 3041-3047), referred to hereunder as "Kruus et al.", the authors study the polymerization of styrene during sonication, evaluating the polymerization rate of styrene in relation to the reaction temperature (bulk temperature) and of the reaction medium. In the article of Kruus et al., the sonication is carried out at a power of 60 W, a power density of 21 W/cm$^2$, and an ultrasound frequency of 20 kHz; the sonication takes place in the presence of Argon. The presence of Argon is necessary for both limiting the cavitation noise and also for favouring the polymerization with respect to the formation of coloured compounds.

In the article of Kruus et al., the authors concluded that the polymerization rate of styrene decreases with a decrease in the polymerization temperature. In particular, below 48° C., the polymerization rate decreases significantly and the production of coloured compounds is observed. The addition of high vapour-pressure hydrocarbon liquids, such as, for example, n-hexane, n-heptane, toluene or cyclohexane, increases the polymerization rate and suppresses the formation of coloured compounds.

In the article "*Polymerization and depolymerization by Ultrasound*" (P. Kruus, J. A. G. Lawrie; and M. L. O'Neill, *Ultrasonics* 1988, Vol. 26, November 352-355) referred to hereunder as "Lawrie et al.", the authors study the effects of the presence of the Argon flow on the polymerization rate and on the molecular weight distribution of styrene when this is exposed to ultrasounds.

In the article of Lawrie et al., the sonication of styrene is described, carried out at a power of 86 W, a power density of 34 W/cm$^2$, and an ultrasound frequency of 20 kHz in the presence of various Argon flows.

The study reveals that when the Argon flow is present, the polymerization of styrene is visible, when the Argon flow is interrupted, the styrene conversion is drastically reduced. In addition, in the periods in which the Argon flow is interrupted, the authors observe the depolymerisation of the polymer formed and the formation of coloured compounds.

On the basis of the teachings of the above-mentioned articles, it can be concluded that low temperatures strongly jeopardize the polymerization of styrene also when subjected to ultrasounds. Furthermore, from the data provided by Suslick, (see article and relative Supplementary Information enclosed with the same), it can be estimated that 18% of the polymer bound to the graphene is in the order of tens of ppm with respect to the initial polymer. It can therefore be concluded that the conversion obtained by Suslick is extremely low, contrary to what is obtained with the process described and claimed in the present text.

Furthermore, according to the teachings of the above-mentioned articles, when the sonication is carried out in the absence of a gaseous flow (Argon, for example), the styrene polymerization is interrupted and depolymerization begins. The process described and claimed in the present patent application, on the contrary, is carried out at higher temperatures and in the absence of a gaseous phase during sonication.

WO 2011/055198 describes a process for the preparation of graphene nanoplatelets starting from graphite and performing the functionalization with oxygen through thermal oxidation, by putting the graphite in contact with oxygen or a substance capable of releasing it (ozone). The partially oxidized graphite is then reduced by means of reducing compounds such as hydrazine, methyl hydrazine, hydrogen. The patent application also describes compositions based on thermoplastic polymers and graphene nanoplatelets with an improved mechanical resistance, electric conductivity and thermal insulation capacity.

WO 2011/042800 describes a composition based on expandable thermoplastic polymers with the best thermo-insulating properties, containing graphene nanoplatelets as athermanous agents. The polymeric foams obtained from these expandable compounds prove to be characterized by a higher thermal insulation with respect to those containing other athermanous agents such as graphite, coal, aluminium particles.

None of the two patent applications mentioned above, however, uses ultrasounds for the production of nanoplatelets or for the production of the relative compounds.

U. Khan et al. "High-Concentration Solvent Exfoliation of Graphene", Small, Volume 6, Issue 7, pages 864-871, 2010, describes a method for obtaining graphene dispersions at a high concentration (up to 1.2 mg/ml) by means of ultrasounds in N-methyl-pyrrolidone (NMP). The time necessary for obtaining so high concentrations, however, is extremely long, up to 460 hours of sonication.

A. Ciesielski, P. Samori, "Graphene via sonication assisted liquid-phase exfoliation", Chem. Soc. Rev., 2014, 43, 381-398, describes various methods and the results obtained in the production of graphene through sonication in liquid phase. The time necessary for the sonication is discussed in detail, and can reach 1,000 hours. A lengthy sonication time is necessary for obtaining solutions at a high concentration (see FIG. 6 indicated in the article), at least 100 hours for a concentration equal to 1 mg/ml. As the same article confirms, a lengthy sonication time causes a reduction of the side dimensions of the nanoparticles obtained, and this is not desirable as the side dimension is a critical parameter for numerous applications.

SUMMARY

The drawbacks and limitations of the known art previously described, are overcome by the composition and process described and claimed in the present text.

An object of the present patent application relates to a composition containing graphene and graphene nanoplatelets durably dispersed in a solvent; said composition is characterized in that:
  a) it contains at least 1% by weight, with respect to the total weight of the solvent, of a vinyl aromatic polymer,
  b) it comprises a mass concentration of graphene and graphene nanoplatelets (GRS) ranging from 0.001% to 10% by weight, with respect to the total weight of the solvent;
wherein said vinyl aromatic polymer is obtained by partial or total polymerization of the relative vinyl aromatic monomer alone or in a mixture of up to 50% by weight with further co-polymerizable monomers, and with the condition that the sum of the possible content of said non-reacted monomers and the content of vinyl aromatic polymer formed, is equal to at least 10% by weight with respect to the total weight of the solvent. The present invention also relates to a process for the preparation of an at least partially polymerized composition, containing graphene and graphene nanoplatelets durably dispersed in a solvent starting from graphite material; said process comprising the following phases:
  a) putting the graphite material in contact with a main solvent comprising at least 10% by weight, with respect to the total weight of the main solvent, of a vinyl aromatic monomer alone or in a mixture of up to 50% by weight with further copolymerizable monomers, forming a starting composition;
  b) subjecting said starting composition to ultrasounds, characterized by a frequency spectrum comprised within the range of 18 kHz to 1000 kHz, and a pressure equal to or higher than 2 bar absolute in a container or sonication chamber wherein in contact with said composition a separated fluid phase in the gaseous state must not be present;
said process being characterized in that at least 1% of the vinyl aromatic monomer present in the main solvent is polymerized.

The present invention is preferably the process as described and claimed for producing the compositions as described and claimed in the present text.

Once the compositions described and claimed in the present text have been obtained, polymeric composites or polymeric nanocomposites, or master batches (also known as concentrated polymeric composites) containing graphene and graphene nanoplatelets, can be prepared, in a subsequent further polymerization step of the main solvent.

Or, said polymeric composites or polymeric nanocomposites or master batches can be obtained directly with the process described and claimed in the present text, completing the polymerization during the same process.

The polymeric compositions, polymeric nanocomposites or concentrates that can be obtained from the compositions described and claimed in the present text have the advantage of containing graphene and graphene nanoplatelets with a high exfoliation degree and a high degree of chemical and crystalline purity.

The process object of the present invention is advantageously simple, easily scalable for large-scale productions and has a low cost and low environmental impact.

In the process according to the present invention, it is advantageously not necessary to effect "solvent exchange" operations, i.e. the substitution of the main solvent used for the exfoliation with the solvent necessary for the application.

In the process according to the present invention, in fact, the exfoliation is effected directly in the main solvent containing the monomer, from which the polymer present in the polymeric composite or polymeric nanocomposite is obtained by polymerization.

The "solvent exchange" operation, in fact, in addition to representing a complication for the process, which generally entails problems from an environmental point of view, can lead to a partial agglomeration of the layers of exfoliated graphite material, thus reducing the quality of the resulting polymeric nanocomposite.

The process, object of the present patent application, advantageously does not involve problems relating to health, safety and environment (HSE) and the handling of nanomaterials. During the operations, in fact, nano-powders are not formed in the free state. The nano-powders are always in solution with the main solvent or are directly englobed in the polymeric component of the final nanocomposite.

The effective times during which the graphite material is subjected to ultrasounds in the process described and claimed, are advantageously shorter than the times normally used in the processes of the known art.

The process described and claimed in the present text is advantageously independent of the interfacial tension of the main solvent.

Said process, in fact, allows the exfoliation of the graphite material to be obtained, and the formation of stable solutions with time, also using solvents having a different interfacial tension from that of the graphite material itself, or in any case solvents which do not belong to those considered more suitable, for example, solvents such as styrene and glycerol, unlike what is described in literature. Reference should be made, for example, to the Supplementary Information of the already mentioned article of Hernandez et al. "High-yield production of graphene by liquid-phase exfoliation of graphite". Table S1 indicates the best solvent for the exfoliation and dispersion of graphene: acetone appears to be much less effective (about 70% less) with respect to the benzyl benzoate; styrene and glycerol are not even mentioned.

The article of Hernandez et al. "High-yield production of graphene by liquid-phase exfoliation of graphite", indicates, as suitable solvents, those having a surface tension ranging from 40 to 50 $mJ/m^2$; furthermore, in the case of the solvent benzoyl benzoate, which is considered the most suitable, after centrifugation, 8.3% by mass of the initial solvent remains; in the case of NMP, 7.6% by mass of the initial solvent remains after centrifugation. The present invention, on the contrary, uses styrene having a surface tension at 120° C. of 26 $mJ/m^2$, or ethylbenzene which, at the same temperature, has a surface tension of 18 $mJ/m^2$. It is therefore surprising that, by using these solvents and under these process conditions, a high exfoliation degree and stability of the solutions with time, can be obtained.

As far as glycerol is concerned, WO 2011/014347 mentioned above, analyzes 50 different solvents for the exfoliation of graphite in graphene nanoplatelets. Glycerol is considered an example of an ineffective solvent in producing graphene nanoplatelets using high-power ultrasounds: raw data indicate that solvents having a contact angle higher than or equal to 90°, such as glycerol, are ineffective in the production of graphene nanoplatelets via high-power sonication, starting from graphite material.

In the process described and claimed in the present text, on the other hand, it is surprisingly possible to obtain a solution of graphene nanoplatelets which is stable with time, also using glycerol.

Further objectives and advantages of the present invention will appear more evident from the following description and enclosed figures, provided for purely illustrative and non-limiting purposes, which represent preferred embodiments of the present invention.

In all the figures from 2 to 9, the final product is collected in a specific collection tank (5).

Figure 10:
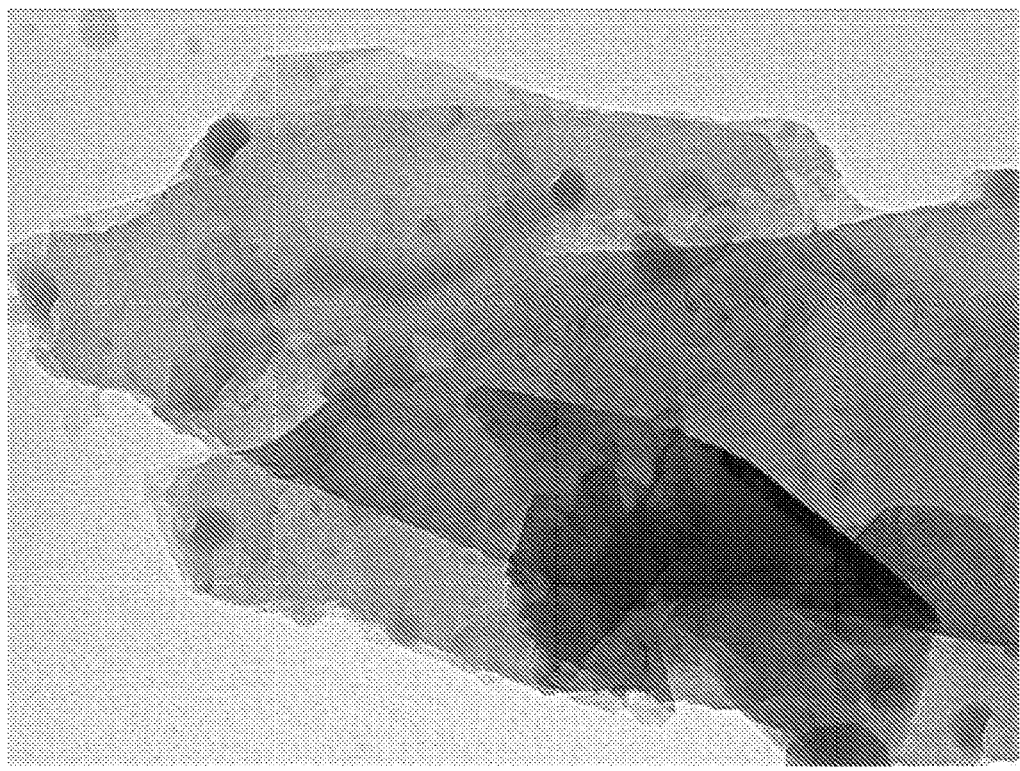

FIG. 10 is a photograph of the product 1B (example 1) obtained by means of a transmission electron microscopy (TEM).

Figure 11:

FIG. 11 is a photograph of the product 2B (example 2) obtained by means of a transmission electron microscopy (TEM).

Figure 12:
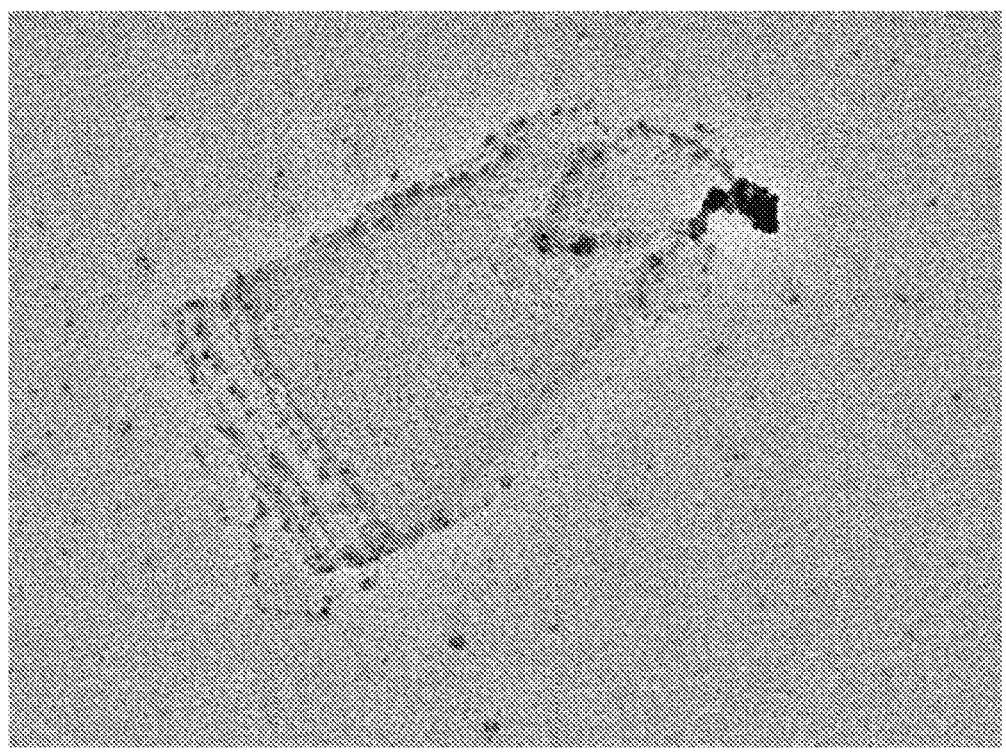

FIG. 12 is a photograph of the product 4B (example 4) obtained by means of a transmission electron microscopy (TEM).

Figure 13:

FIG. 13 is a photograph of the Product 1A (see Example 1) compared with the same composition of Example 1 not treated with ultrasounds.

Figure 14:

FIG. 14 is a photograph of the Product 1A (see example 1) compared with the same composition of Example 1 treated with ultrasounds at atmospheric pressure. (Comparative Example 1).

DETAILED DESCRIPTION

The invention, object of the present patent application, is now described in detail.

The present invention relates, in the first place, to a composition containing a solvent, graphene and graphene nanoplatelets durably dispersed in said solvent. Said composition is characterized in that it contains at least 1% by weight, with respect to the total weight of the solvent, of a vinyl aromatic polymer and comprises a mass concentration of graphene and graphene nanoplatelets (GRS) ranging from 0.001% to 10% by weight with respect to the total weight of the solvent.

Said vinyl aromatic polymer is obtained by partial or total polymerization of the relative vinyl aromatic monomer alone or in a mixture of up to 50% by weight with further copolymerizable monomers, and with the condition that the sum of the possible content of said non-reacted vinyl aromatic monomers possibly mixed with further non-reacted copolymerizable monomers, and the content of said vinyl aromatic polymer is equal to at least 10% by weight with respect to the total weight of the solvent.

In the case of the partial polymerization of the monomers, the vinyl aromatic monomer is preferably at least 10% by weight with respect to the sum of the weights of all of the monomers and said vinyl aromatic polymer; the vinyl aromatic monomer is even more preferably at least 25% by weight with respect to the sum of the weights of all of the monomers and said vinyl aromatic polymer.

The content of the vinyl aromatic polymer is preferably at least 5% by weight, more preferably at least 10% by weight, with respect to the total weight of the solvent. The content of the vinyl aromatic polymer is preferably lower than or equal to 70% by weight with respect to the total weight of the solvent.

The content of the vinyl aromatic polymer preferably ranges from 5% by weight to 70% by weight with respect to the total weight of the solvent, more preferably from 10% by weight to 70% by weight with respect to the total weight of the solvent.

The sum of the possible content of said non-reacted vinyl aromatic monomers, possibly mixed with further non-reacted copolymerizable monomers, and the content of said aromatic vinyl polymer is preferably equal to at least 20% by weight, more preferably at least 80% by weight, with respect to the total weight of the solvent.

The mass concentration of graphene and graphene nanoplatelets (GRS) in the composition described and claimed, preferably ranges from 0.05% to 5% by weight, even more preferably from 0.2% to 2.5% by weight, with respect to the total weight of the solvent.

The GRS can preferably be characterized by an average thickness lower than or equal to 50 nm, more preferably lower than or equal to 20 nm, even more preferably lower than or equal to 5 nm, and in any case higher than or equal to the thickness of the single graphene layer.

The thickness is measured in some samples of GRS deposited on a silicon wafer coated with silicon oxide, by means of intermittent contact atomic force microscopy (AFM tapping mode).

The GRS can preferably have a molar ratio Carbon/Oxygen (C/O) higher than or equal to 10, more preferably higher than or equal to 30, even more preferably higher than or equal to 50, even more preferably higher than or equal to 100. The ratio (C/O) is obtained by means of X-ray photo-electron spectroscopy (XPS) of the GRS.

In the composition described and claimed, the graphene and graphene nanoplatelets preferably have a molar ratio Carbon/Oxygen higher than or equal to 10 and an average thickness lower than or equal to 50 nm, and in any case higher than or equal to the thickness of the single graphene layer.

The composition obtained has a weight average molecular weight (MW) ranging from 50 to 500 kDaltons, measured with High-Performance Size-Exclusion Chromatography according to ASTM D5296-11, and has a melt flow index (MFI at 200° C., 5 kg) ranging from 3 to 50. The fluidity index is measured according to ISO 1133, fourth edition, 2005. The molecular-weight distribution is measured by means of high-performance size-exclusion chromatography according to ASTM D5296-11, using a refractive index detector, and is effected on the polymer after separation from the GRS and subsequent precipitation.

A further object of the invention relates to a process for the preparation of an at least partially polymerized composition, containing graphene and graphene nanoplatelets durably dispersed in a solvent, starting from graphite material; said process comprising the following steps:
 a) putting the graphite material in contact with a main solvent which comprises at least 10% by weight, with respect to the total weight of the main solvent, of a vinyl aromatic monomer alone or in a mixture of up to 50% by weight with further copolymerizable monomers, forming a starting composition;
 b) subjecting said starting composition to ultrasounds, characterized by a frequency spectrum ranging from 18 kHz to 1,000 kHz, at a pressure equal to or higher than 2 bar absolute and in a container or sonication chamber wherein in contact with said composition a separated fluid phase in
 the gaseous state must not be present; said process being characterized in that at least 1% of the vinyl aromatic monomer present in the main solvent is polymerized.

In a preferred embodiment, the present invention relates to a process for the preparation of the compositions described and claimed in the present text, starting from graphite material; said process comprising the following steps:
 a) putting the graphite material in contact with a main solvent which comprises at least 10% by weight, with respect to the total weight of the main solvent, of a vinyl aromatic monomer alone or in a mixture of up to 50% by weight with other copolymerizable monomers, forming a starting composition;
 b) subjecting said starting composition to ultrasounds, characterized by a frequency spectrum ranging from 18 kHz to 1,000 kHz, at a pressure equal to or higher than 2 bar absolute and in a container or sonication chamber wherein in contact with said composition a separated fluid phase in
 the gaseous state must not be present; said process being characterized in that at least 1% of the vinyl aromatic monomer present in the main solvent is polymerized.

In the process described and claimed, and in all its preferred embodiments, the steps (a) and (b) can occur simultaneously or in sequence.

In the process described and claimed, and in all its preferred embodiments, at least 1%, preferably at least 5%, more preferably from 10% to 80%, and even more preferably from 15% to 50% of the monomers present in the main solvent are polymerized.

The process described and claimed in the present text can be carried out either in a continuous flow mode, or with a continuous flow, or in a batch flow mode, or a discontinuous flow mode.

At the end of the process described and claimed, a partially or totally polymerized composition is obtained, wherein the graphene and graphene nanoplatelets are durably dispersed in a solvent and preferably the composition described and claimed in the present text.

Said compositions can be subsequently subjected, as explained in more detail further on in the text, to a further polymerization step, completing the polymerization and thus forming polymeric composites, polymeric nanocomposites or master batches (also known as concentrated polymeric nanocomposites).

The polymerization step, either partial or complete, of the compositions containing graphene and graphene nanoplatelets durably dispersed in a solvent, takes place directly during the sonication by continuing the polymerization, either partially or totally, of the polymerizable monomers used, preferably a vinyl aromatic monomer, contained in the main solvent.

When complete polymerization takes place, during the sonication, polymeric composites or polymeric nanocomposites containing graphene and graphene nanoplatelets characterized by a high dispersion of graphene and graphene nanoplatelets, are obtained directly.

The process can also be carried out in a single step starting from graphite material and a main reactive solvent that comprises at least 10% by weight of a vinyl aromatic monomer alone or in a mixture of up to 50% by weight with further copolymerizable monomers. In the case of a complete polymerization, it can be advantageous to also use, in addition to the reactive monomer, an inert substance (such as, for example, ethylbenzene) capable of limiting the viscosity of the solution when there are high quantities of polymer in the solution. This substance can already be initially present in the solution, or it can be added during the sonication treatment when the viscosity begins to rise due to an increase in the quantity of polymer (see "secondary solvent" described hereunder). With the term "single step", the applicant intends that, during the ultrasound treatment, the exfoliation of the graphite material, the dispersion in the main solvent and the partial or complete polymerization of the monomers present in the main solvent, take place simultaneously.

During the partial or complete polymerization, at least 1% of the monomers present in the main solvent, more preferably at least 5%, even more preferably from 10% to 80%, and even more preferably from 15% to 50% of the monomers present in the main solvent, are polymerized.

The polymerization of the monomer is demonstrated by the content of solids in the product subjected to evaporation under vacuum.

The main solvent, in addition to directly influencing the effectiveness of the sonication (as described in the examples), can be advantageously used for controlling the viscosity of the composition during the ultrasound treatment, and the desired polymerization degree. Furthermore, the main solvent can also be used for preventing the triggering of uncontrolled run-away reactions, using, for example, ethylbenzene.

The solvent is preferably a vinyl aromatic monomer, possibly mixed with further polymerizable co-monomers and the possible corresponding polymer that is formed during the polymerization.

The main solvent is preferably selected from vinyl aromatic monomers, organic compounds capable of dissolving the vinyl aromatic polymers and vinyl aromatic monomers, pentane and mixtures thereof; it is more preferably selected from vinyl aromatic monomers, ethylbenzene and mixtures thereof; styrene, ethylbenzene and mixtures thereof, are even more preferred.

During the process according to the present invention, further chemical agents selected from polymers, nucleating agents and initiators, can be added to promote the polymerization. Among the polymers, preference is given to polymers soluble in the main solvent itself. The polymer more preferably may contains monomeric units corresponding to those present in the polymerizable monomer. Said further chemical agents can be added before or during the sonication.

Among the initiators, peroxides are preferred; more preferably selected from 1,1-di(tert-butylperoxy) cyclohexane (Trigonox 22E50, AkzoNobel), tert-butylperoxy 2-ethylhexyl carbonate (Trigonox 117, AkzoNobel), dibenzoyl peroxide (Perkadox L-W75, AkzoNobel), dicumyl peroxide (Perkadox BC-FF, AkzoNobel), or substances with a weak bond between carbon atoms, such as 2,3 dimethyl 2,3 diphenyl butane, (Perkadox 30, Akzo Nobel). The further chemical agents and in particular the initiators can be added in the preparation phase of the starting composition or during the sonication treatment.

Thanks to the process described and claimed in the present text, the graphene and graphene nanoplatelets are extremely well-dispersed in both the final composition, that can be in liquid phase, and also in the polymeric composite or in the polymeric nanocomposite obtained by polymerizing starting from said final composition.

The graphene and graphene nanoplatelets present in the final composition, or polymeric composite or polymeric nanocomposite described and claimed in the present text, are characterized by an average thickness lower than or equal to 50 nm, more preferably lower than or equal to 20 nm, even more preferably lower than or equal to 5 nm, and in any case higher than or equal to the thickness of the single graphene layer.

The thickness is measured on some samples of GRS deposited on a silicon wafer coated with silicon oxide, by means of intermittent contact atomic force microscopy (AFM tapping mode).

The graphene and graphene nanoplatelets present in the final composition, in the polymeric composite or in the polymeric nanocomposite described and claimed in the present text, are characterized by a high crystalline and chemical purity. In particular, the carbon/oxygen (C/O) molar ratio is higher than or equal to 10, more preferably higher than or equal to 30, even more preferably higher than or equal to 50, even more preferably higher than or equal to 100.

The ratio (C/O) is obtained by means of X-ray photoelectron spectroscopy (XPS) of the GRS.

These characteristics give the polymeric nanocomposites obtained, good electrical conductivity properties, good mechanical performances and good thermal insulation capabilities in the case of derivative expandable composites.

Once the polymeric composites, polymeric nanocomposites or master batches have been prepared, these can be processed by means of the usual technologies adopted in the field of the transformation of polymeric materials, such as, for example, extrusion, injection moulding and compression moulding to obtain the derivative polymers.

Figure 9:
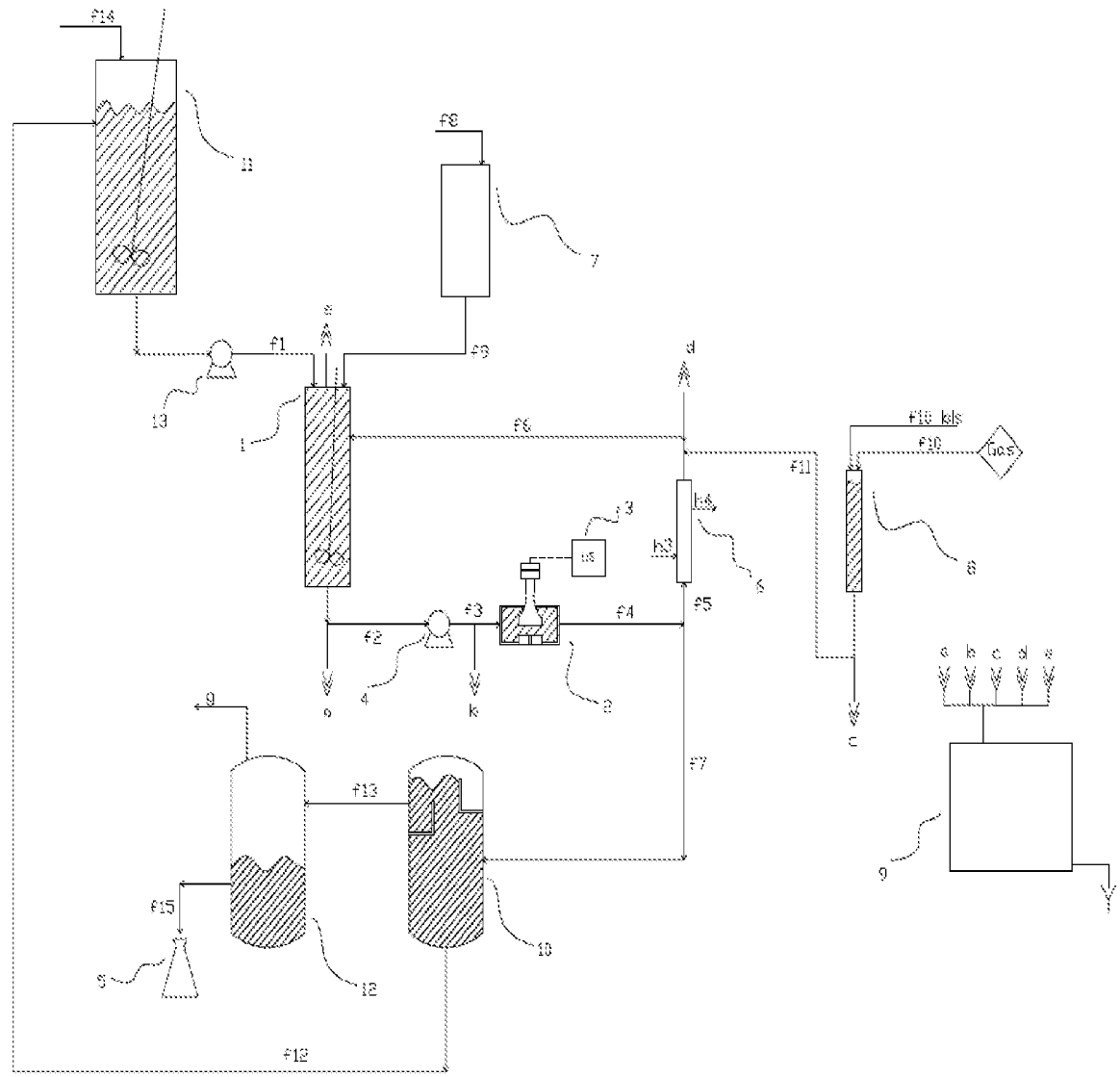
FIG. 9 shows a configuration similar to that of FIG. 8 but also with a concentrator (12).

As is clear in the following examples, the formation of a stable dispersion is demonstrated by the fact that the dispersions obtained with the process according to the present invention are visibly stable, i.e. without any evident formations of deposits or separated phases, even after 30 days. Furthermore, a stable dispersion is only possible if there has been at least a partial exfoliation of the graphite material. The photographs taken with a transmission electron microscope (TEM) also demonstrate the formation of graphene nanoplatelets as illustrated in FIGS. 9, 10 and 11.

As already indicated, the graphite material, used for the purposes of the present invention, essentially consists of graphite carbon. The graphite carbon of the starting graphite material can preferably be selected from synthetic graphite, natural graphite, expanded graphite, highly ordered pyrolytic graphite (HOPG), vein graphite, or intercalated graphite.

Non-graphite carbon can also be present with the graphite material, preferably selected from coke or carbon black, or graphitized coke.

Particular procedures for the preparation of the starting composition obtained in step a) of the process described and claimed, are not necessary. According to a preferred procedure, the liquid and solid components of the starting composition are mixed together by means of a suitable mixing system, not necessarily intensive, but sufficient for giving the mixture an initial homogenization. This initial homogenization mainly serves for making the starting composition fluid, so as to avoid, for example, problems in the pumping phase (for example, the possible pumps may not function or may function badly if they are fed with exclusively solid material).

For this purpose, for example, any kind of stirrer can be used, or static mixers or dynamic mixers such as, for example, lobe pumps or extruders. The time necessary is that required for making the composition fluid. Typically, 30 seconds are generally already sufficient, but longer times can be equally used. It may be useful to carry out the operation at a different temperature from room temperature in order to obtain a viscosity compatible with the mixing system used:

if a marine propeller stirrer is used, for example, the temperature must be such as to obtain a viscosity within the range of 0.2-5,000 cP.

The ultrasound treatment is carried out in a container or sonication chamber in which in contact with said composition a separated fluid phase in the gaseous state must not be present.

Consequently, a second fluid phase in the gaseous state in contact with said composition, must not be present in the sonication chamber. In particular, sonication effected in open containers where there is direct contact with atmospheric air or other gases such as, for example, nitrogen or argon, which therefore form a second phase in the gaseous state in contact with the starting composition subjected to ultrasounds, does not fall within the scope of the present invention.

The starting composition, circulating in the sonication loop during the treatment, preferably has a viscosity of at least 0.1 Pa·s and which is lower than or equal to 1,000 Pa·s, more preferably higher than or equal to 0.1 Pa·s and lower than or equal to 100 Pa·s. For this purpose, the use of a secondary solvent suitable for diluting the starting composition during the ultrasound treatment, may be useful. Said secondary solvent can, for example, be ethylbenzene or it can be identical to the main solvent. The addition of said secondary solvent is optional. Said secondary solvent is added during the ultrasound treatment.

The ultrasound treatment is preferably effected at a specific ultrasound power, calculated as electric power generated by the ultrasound generator with respect to the volume of the chamber in which the ultrasounds are applied, of at least 60 W/cm$^3$. Even more preferably, the specific ultrasound power is at least 110 W/cm$^3$.

The process described and claimed in the present patent application has ultrasound treatment times in the order of minutes, more preferably seconds, also indicated as effective duration or effective times.

The effective duration of the ultrasound treatment is preferably lower than or equal to 20 minutes and higher than or equal to 0.1 seconds; it even more preferably ranges from 0.5 seconds to 5 minutes, even more preferably from 1 second to 1 minute, and even more preferably ranges from 2 seconds to 30 seconds.

Effective time refers to the time in which the composition is effectively subjected to ultrasound radiations.

In batch mode, for example, said time corresponds to the overall time in which the ultrasound radiations are generated. In continuous flow mode, said time corresponds (in the case of the continuous generation of ultrasounds) to the residence time in the chamber in which the ultrasounds are generated, generally calculated as the ratio between the volume occupied and the volumetric flow-rate. If the ultrasounds are generated cyclically, i.e. when the generation of ultrasounds is alternated with periods of substantial absence of ultrasound generation, the effective time is therefore calculated by multiplying the residence time by the fraction of effective ultrasound generation time.

The data provided on the actual duration of the sonication treatment according to the present invention is extremely surprising, as, traditionally, in the processes described in the known art, the ultrasound treatment time necessary for having a good dispersion and exfoliation of the graphite, above all at a high concentration, is in the order of hours or even days.

An ultrasound treatment time in the order of minutes, is not only more efficient from an energy and economic point of view, but also facilitates the scale-up of the production on an industrial scale. Furthermore, by reducing the actual ultrasound treatment time, the modification of the graphene nanoplatelets and graphene is also reduced and, in particular, the reduction in the side dimension of the particles of graphene nanoplatelets and graphene is limited, which would lead to a reduction in the aspect ratio (ratio between the side dimension and the thickness). A reduction in the aspect ratio is generally not desirable as this increases the electrical and rheological percolation threshold in the resulting polymeric composites, it reduces the absorbing capacity of infrared radiation and reduces the mechanical performances.

During the ultrasound treatment, the starting composition must be brought to a pressure equal to or higher than 2 bar absolute, preferably ranging from 8 to 50 bar absolute, even more preferably ranging from 12 to 25 bar absolute. The pressure can preferably be higher than the vapour pressure of the solvent used in the process, when the solvent is a single chemical compound, or of the chemical compound present in a greater quantity by weight, when the solvent is formed by more chemical compounds.

The pressurization of the starting composition can take place before or during the ultrasound treatment.

Operating at a higher pressure than atmospheric pressure, and especially within the ranges described above, is essential for obtaining the final compositions described and claimed in the present patent application. In particular, this has proved to be essential for obtaining a stable dispersion for at least 30 days, and for obtaining the exfoliation and polymerization in a single step, as previously described.

A skilled person in the art would, in fact, believe that the high pressure could inhibit the cavitation and therefore the effectiveness of the ultrasound treatment, as an increase in pressure causes an increase in the cavitation threshold. This occurs as the sound pressure during the negative phase (during which cavitation bubbles are generated) must not only overcome the tensile strength of the means in which the ultrasounds are propagated, but also the hydrostatic pressure added.

Consequently, a pressure increase, according to the teachings of the state of the art, can dampen the sonication as it dampens the cavitation, the intensity of the sonotrode (power sonotrode) must be increased in order to favour the sonication.

According to the teachings of the present invention, on the contrary, high pressure values are essential (as indicated above) during the sonic treatment. Consequently, according to what is taught in the state of the art, for a skilled person in the art, an increase in the pressure values would make the treatment itself ineffective.

The pressurization before or during the ultrasound treatment can be effected according to any of the procedures known in the art. It can be effected, for example, by means of a pumping and/or supply device, such as a gear pump before the ultrasound treatment. Said pump can, for example, be the same as that with which the starting composition is fed to the circuit in which the ultrasound treatment takes place. According to another mode, the pressurization can be effected using an expansion fluid which is put in contact, directly or indirectly, with the fluid subjected to ultrasounds, as described in more detail hereunder. According to a further procedure, a second pumping device can be positioned after the ultrasound treatment, in counterflow (for example with the pumping direction opposite to the flow direction), so as to keep the flow subjected to sonication under pressure.

Once the starting composition has been pressurized, it can be advantageous to keep the pressure stable with time. This can be achieved according to any procedure known in the art: for example using a regulation valve downstream of the sonication, or by regulating the rate of the supply pump, or by means of a direct or indirect expansion tank.

The direct or indirect expansion tank stabilization technique can be used for either a batch scheme or for a continuous scheme, or in plants that can envisage use in both continuous and batch mode; it is therefore particularly flexible. An indirect expansion tank comprises an apparatus containing a movable or flexible septum, which separates two chambers of which one contains the fluid to be stabilized, in this context the starting composition, and the other the stabilizing fluid, preferably an inert gas. The latter exerts a pressure against the septum, which, as it is movable or flexible, in turn exerts pressure against the fluid to be stabilized. The two fluids are therefore kept at the same pressure without there being any contact between each other. The compressibility of a gas is greater than the compressibility of liquids, for which variations in the volume of a liquid, due, for example, to thermal expansions, injections or samples, or chemical reactions, would lead a strong variation in the pressure. The gas, on the other hand, is capable of absorbing these variations without any substantial change in pressure. Consequently, the use of an apparatus such as that described above allows stabilization of the pressure.

Alternatively, and more preferably, the pressure stabilization is effected with a direct expansion tank.

According to this mode, the composition being treated is put in direct contact with a gaseous phase, or an expansion fluid in the liquid state, which in turn is in contact with a gaseous phase. The gaseous phase in any case has a sufficiently large volume for allowing the stabilization of the pressure due, for example, to a variation in the volume of the composition being treated following a variation in the temperature of the same. The volume of the gaseous phase, for example, is equal to or greater than $1/10$ of the volume of the composition being treated.

In the direct expansion tank mode, when pressure is applied to one of the two phases, both are brought by direct contact to the same pressure. This mode is advantageous with respect to the use of an indirect expansion tank, as it allows wide variations in volume to be absorbed, and is unaffected by the inevitable mechanical rigidities of the septum which in some way reduce the effectiveness of the device. The septum must also be chemically and physically compatible with the starting composition.

It is desirable, however, to limit the absorption of gas on the part of said composition, as the effectiveness of the ultrasound treatment greatly depends on the presence of gas in said composition. If in fact, on the one hand, the gas bubbles act as nuclei for cavitation, favouring the ultrasound process, on the other, they reduce the intensity of the shock wave due to the absorbing effect. Direct contact between the liquid phase and gaseous phase allows a part of the gaseous phase to slowly dissolve in the liquid and alter the functioning of the ultrasounds with time.

The Applicant has found that this problem can be solved by reducing or eliminating the liquid-gas contact surface.

A preferred way of reducing the liquid-gas contact surface is to effect the liquid-gas contact inside a vertical pipe having a sufficiently small diameter (for example a diameter varying from 3 mm to 15 mm, for a sonication loop having a volume ranging from 1 to 8 liters), or an equivalent apparatus, having a length which is at least such that the corresponding volume is greater than the volume of the liquid that must be moved to balance the pressure, and having a length-diameter ratio at least equal to 10, preferably at least equal to 20, even more preferably higher than 50. In this way, the contact can be minimized, while allowing large variations in volume.

The contact area between the composition being treated and the gas is outside the sonication chamber. The pipe in which there is contact between liquid and gas, for example, can be connected to the sonication loop by means of a side nozzle or other branching, as described in more detail hereunder. All the liquid contained in said pipe, as far as the connection with the sonication loop, is therefore in an area in which the composition being treated does not circulate.

In order to further reduce the quantity of gas that dissolves upon contact between the two phases, a liquid fluid, also called expansion fluid, preferably can also be applied, to be interposed between the composition being treated with ultrasounds and the stabilization gas. This can take place either prior to or simultaneously with the application of ultrasounds to the composition. The expansion fluid can be selected from the starting composition itself, preferably without the polymeric component, or another liquid fluid which preferably does not contain solid phases.

According to this mode, the composition being treated is put in direct contact with the expansion fluid, for example a vertical pipe, or equivalent apparatus, having a diameter which is sufficiently small as to minimize the diffusion of one fluid towards the other. A vertical pipe or equivalent apparatus, for example, having a length which is at least such that the corresponding volume is greater than the volume of the liquid to be moved for balancing the pressure, and having a length-diameter ratio equal to at least 10, preferably equal to at least 20, even more preferably higher than 50.

The expansion fluid can in turn be connected to a direct or indirect stabilization device as previously described. In this case, the direct stabilization device does not necessarily have a small surface as there is no need to limit the contact surface. The expansion fluid is in fact between the direct stabilization device and the contact with the process fluid.

By adopting these implementation modes, as will appear more evident from the examples provided hereunder, a greater stability of the ultrasound treatment has been observed, together with a greater effectiveness in the transmission of ultrasound waves.

Alternatively to or combined with the procedures described above, in both batch mode and in continuous mode, other devices known to skilled persons in the art for regulating the pressure, can also be used, such as, for example, relief valves, rupture discs, safety valves, and pumping devices such as gear pumps, whose velocity is regulated in order to maintain the desired counterpressure. The ultrasounds can be applied according to a direct mode or indirect mode, as described in more detail hereunder. This is true when the process, object of the invention, is carried out both in continuous and also in batch mode.

The ultrasounds can be generated by any known device for the purpose that contains active materials capable of expanding and contracting with appropriate stress. These active materials are preferably selected from piezoelectric ceramics subjected to a suitable high-voltage alternating electric field, or giant magnetostrictive materials. The periodical variation in length of the active materials is generally extremely small (for example, lower than or equal to 50 microns) and can therefore require suitable amplification, typically produced in a suitably shaped metallic material having a resonance frequency close to that of the electric/magnetic field applied to the active material.

Said metallic material, hereinafter defined as transducer, is applied, according to the direct mode, on the one hand to the active material, and on the other, it is in direct contact with the starting composition to be treated ("direct transducer").

According to the indirect mode, on the other hand, the transducer is applied on the one hand to the active material, and on the other, it is in contact with the container in which the starting composition to be treated is contained, by means of gluing or welding ("indirect transducer"). In the latter case, the sound waves pass firstly through the walls of the container in which the composition to be treated is introduced and then to the composition to be treated.

According to the teachings of the present invention, any ultrasound generation mode can be used. The direct mode is preferred.

There is no particular limit to the number of transducers used in the container. The number of transducers is calculated on the basis of the ultrasonic power to be applied to the composition: on small volumes, for example less than 1 liter, a single transducer can be sufficient, whereas on larger volumes, for example more than 1 liter, it may be convenient to use two or more transducers.

The resonance frequency of the transducers is not necessarily the same for all the transducers applied. There can even be any angle formed between the various transducers. According to a mode of the present invention, if more transducers are applied, it may be advantageous to apply the transducers so that there are opposing, i.e. with the composition passing in the space between the ends of the same transducers.

The device in which the ultrasound treatment is carried out can be any device in which the starting composition can be fed and an ultrasound field can be applied, under the temperature, pressure and sound intensity conditions previously indicated.

As previously specified, the process, object of the present invention, can be carried out in continuous mode, or in batch mode.

In the batch mode, the starting composition to be treated is loaded into the device suitable for effecting the ultrasound treatment, for example by collecting said composition from a storage tank by means of a pump or by gravity. The starting composition to be treated is then pressurized and brought to the desired temperature, the ultrasound treatment is then carried out for the required time, and the treated composition is finally discharged from the device.

In the continuous mode, on the other hand, the starting composition is loaded continuously into the sonication chamber, for example by means of a pump, the ultrasound treatment is then effected. The starting composition is typically recirculated various times, by means of a recirculation pump, in the sonication chamber before leaving the device. In this way, it is subjected various times to the action of the ultrasounds and the equipment can be run with a continuous cycle (24 h/24 h). This also allows the temperature, pressure and flow-rate conditions to be kept constant with time, thus maximizing the production and qualitative constancy of the product obtained.

The sonication loop consists in the combination of volumes in which the fluid subjected to ultrasounds is circulated. These volumes comprise the volumes in contact with the process fluid of the circulation pump, the sonication chamber, any possible exchangers, tubes, adaptors, measurement equipment, pressure stabilization devices, valves and so forth.

When the process, object of the present invention, is carried out in continuous mode, the device in which the ultrasound treatment takes place (sonication chamber) has a volume occupied by the starting composition which is at the most 50% of the overall volume of the sonication loop, preferably at the most 15%, even more preferably at the most 2%.

With both the continuous procedure and the batch procedure, the ultrasounds can be applied according to the direct mode or indirect mode, previously described. The direct mode is preferably applied.

The surface on which the generation of ultrasounds takes place is preferably equal to at least 10% of the surface of the sonication chamber, even more preferably at least 30% of the surface of said chamber.

In a preferred procedure, the ultrasounds are transmitted to the starting composition with pulses, alternating periods in which said composition is subjected to the action of ultrasounds, also called active period, with periods in which said composition is not subjected to any ultrasonic field, or is subjected to an ultrasonic field having a power at least 10 times lower than the power of the ultrasounds transmitted during the active period. This period is called passive period.

The pulse mode, defined above, must take place following a ratio between the active period and the sum of the active and passive periods, defined in the present patent application as "duty cycle", ranging from 0.0001 to 1, more preferably from 0.0005 to 0.3, even more preferably from 0.001 to 0.05.

In fact, considering the continuous flow mode, for example, and following a small volume, as desired, of fluid in the sonication loop, this will be subjected to the action of ultrasounds during the period of time in which it remains in the sonication chamber (active period). On leaving the sonication chamber, said volume of fluid is no longer affected by the ultrasonic field. At the most, close to the inlet or outlet of the sonication chamber, said volume of fluid can be subjected to an ultrasonic field having a much lower power (at least 10 times less). The time spent by said fluid volume outside the sonication chamber is therefore the passive period, whereas the time spent in the sonication chamber is the active period.

The generation and emission of ultrasounds can be kept at a constant power for the whole duration of the test, or it can be modulated with time, by periodically varying the ultrasonic power emitted. This modulation can typically be effected by periodically interrupting the generation of ultrasounds for a predetermined time (zero power), or periodically modulating the electric current supplied to the transducer, for example according to a sinusoidal or sawtooth shape.

If the ultrasound power is modulated with time, the active period can be further reduced as the volume of fluid can enter the sonication chamber during the periodic interruption period of the ultrasounds.

In any case, with or without modulation of the ultrasonic power, the volume of fluid in the sonication loop is subjected to the action of ultrasounds only for a fraction of time, as active cycles are followed by passive cycles and so forth.

In the batch flow procedure, the pulse mode can be obtained by modulating the generation of sound waves in time cycles as indicated above.

In the continuous flow mode, if the ultrasounds are generated without time modulation (for example at a constant power with time), the duty cycle corresponds to the ratio between the volume of the sonication chamber and the volume of the sonication loop. The solution, in fact, is continuously recirculated in the sonication loop but is only subjected to ultrasounds for the fraction of time in which it remains in the sonication chamber.

Again in the continuous flow mode, if the generation of ultrasounds is modulated with time, the duty cycle is given by the ratio between the volume of the sonication chamber and the volume of the sonication loop, multiplied by the fraction of time in which the generation of ultrasounds is active, or more generally, multiplied by the fraction of average power applied to the ultrasound generator.

In the "pulse mode", the number of periods in which the starting composition is subjected to ultrasounds is preferably greater than or equal to 10 and lower than or equal to 100,000, even more preferably greater than or equal to 100 and lower than or equal to 100,000.

The starting composition is preferably subjected to ultrasound treatment at a temperature higher than or equal to 20° C., more preferably higher than or equal to 40° C., even more preferably higher than or equal to 60° C., and even more preferably higher than or equal to 90° C.

The treatment can also be effected at a temperature lower than or equal to 110° C. The starting composition is preferably subjected to ultrasound treatment at a temperature lower than or equal to 200° C., more preferably lower than or equal to 170° C., even more preferably lower than or equal to 150° C., and even more preferably lower than or equal to 130° C.

The starting composition is preferably subjected to ultrasound treatment at a temperature ranging from 20° C. to 200° C., preferably from 40° C. to 200° C., even more preferably from 40° C. to 170° C., even more preferably from 60° C. to 130° C.

It is known in the art that the temperature normally used in ultrasound treatments is room temperature or, in some cases, temperatures lower than room temperature and close to 0° C.

The results of the present invention, on the contrary, are preferably and surprisingly obtained with temperatures higher than room temperature, as indicated above.

An excessively high temperature, in fact, generally makes the sonication process less effective. At the same time, the temperature conditions used are outside the range industrially used in the polymerization of the monomers adopted.

On the other hand, the process described and claimed demonstrates that an effective sonication can be surprisingly obtained, with exfoliation of the graphite material into GRS, and simultaneously a polymerization of the polymerizable monomer in a single step.

The temperature can be maintained within the required range by means of one or more heat exchangers, or by means of resistances or thermal jackets, coils, electric resistances, Peltier cells, or using the same ultrasounds as heat source. The temperature regulation is possibly effected outside the chamber in which the composition is subjected to ultrasounds (sonication chamber), by continuously or periodically recirculating the composition treated in a heat exchanger.

The temperature is not necessarily constant in time and space, as it can vary within the range indicated.

The ultrasounds, for example, can be applied to the composition at room temperature, gradually bringing it to the target temperature. Or, if preferred, the composition can be preheated, applying ultrasounds only to compositions already at the target temperature. Or again, the temperature can vary with time and/or in space, according to a predetermined scheme.

In batch mode, the ultrasounds can also be transmitted in a non-pulsed mode. In this mode, the composition is permanently kept in the sonication chamber, where the ultrasounds are preferably emitted continuously (e.g. without time interruptions) for the whole duration of the treatment.

The volume in which the ultrasound treatment is effected, called sonication chamber, is any device into which the composition is fed and in which an ultrasound field can be applied, under the temperature, pressure and sound intensity conditions previously indicated.

In the continuous flow mode, the chamber in which the ultrasound treatment takes place, advantageously has a volume occupied by the mixture which is at the most 50% of the overall volume of the sonication loop, preferably at the most 15%, even more preferably at the most 2%. This makes the treatment itself more effective. In this way, in fact the action of the ultrasounds can be concentrated in a reduced volume of fluid, resulting in a shorter but more intense, and consequently more effective, action. The increased effectiveness also allows a lower consumption of electric energy per quantity of composite produced.

In both continuous flow and batch mode, the surface on which the generation of ultrasounds takes place can be equal to at least 10% of the surface of the chamber in which the ultrasound treatment is effected, even more preferably at least 30% of the surface of said chamber.

In a preferred embodiment, the starting composition obtained in step (a) of the process described and claimed is degassed before or during the ultrasound treatment so as to release the quantities of gas that are normally dissolved in a liquid phase. The degassing can be effected by purging the starting composition, preferably from test samples positioned in the highest point of the loop or container where the composition is situated (e.g. for venting), or by introducing the starting composition into a sufficiently large container for allowing the gas to be vented from an opening positioned in the upper part of the same.

This treatment allows the removal of the gases present, in particular the gases present in the volume of the apparatus before loading the starting composition, and the gas present in said composition and/or produced during the ultrasound treatment (such as for example, low-boiling decomposition products of the solvent).

The same action of the ultrasounds facilitates the separation of the liquid from the dissolved gas; the degassing can therefore be advantageously effected during the treatment, in both batch mode and in continuous flow mode.

The process described and claimed in the present text surprisingly allows obtaining the dispersion and exfoliation of the graphite material into graphene and graphene nanoplatelets, substantially without altering the electronic and chemical purity properties of the original graphite material.

In addition to the dispersion and exfoliation, the process, object of the present invention, at the same time allows the partial or total polymerization of the polymerizable monomer to be effected, thus obtaining the direct synthesis of a polymeric composite.

According to the state of the art, in order to obtain a polymeric composite, the graphene and graphene nanoplatelets produced must be previously extracted and subsequently dispersed in the polymer. This implies not only complex supplementary unitary operations and non-environmental friendly removal processes of the solvent, but it also reduces the effectiveness of the treatment as the extraction of graphene and graphene nanoplatelets inevitably entails a partial re-aggregation of the layers previously exfoliated.

As previously specified, the solvent used in the process, object of the present patent application, must contain at least 10% by weight of a vinyl aromatic monomer alone or in a mixture of up to 50% by weight with other copolymerizable monomers.

The term "vinyl aromatic monomer", as used in the present description and claims, essentially refers to a product that corresponds to the following general formula:

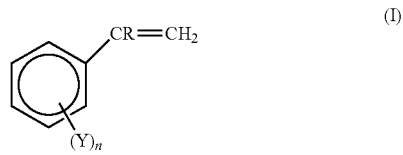

wherein R is a hydrogen or methyl group, n is zero or an integer ranging from 1 to 5 and Y is a halogen selected from chlorine or bromine, or an alkyl or alkoxyl radical having from 1 to 4 carbon atoms.

Preferred vinyl aromatic monomers can be selected from: styrene, α-methylstyrene, methylstyrene, ethylstyrene, butylstyrene, dimethylstyrene, mono-, di-, tri-, tetra- and penta-chlorostyrene, bromo-styrene, methoxy-styrene, acetoxy-styrene, etc. Preferred vinyl aromatic monomers are styrene and α-methylstyrene.

As already specified, the vinyl aromatic monomers having general formula (I) can be used alone or in a mixture of up to 50% by weight with further co-polymerizable monomers. Examples of these further co-polymerizable monomers are (meth)acrylic acid, $C_1$-$C_4$ alkyl esters of (meth)acrylic acid, such as methyl acrylate, methylmethacrylate, ethyl acrylate, ethylmethacrylate, isopropyl acrylate, butyl acrylate, amides and nitriles of (meth)acrylic acid, such as acrylamide, methacrylamide, acrylonitrile, methacrylonitrile, butadiene, ethylene, divinylbenzene, maleic anhydride, etc. Preferred co-polymerizable monomers are acrylonitrile, maleic anhydride, glycidyl methacrylate and methylmethacrylate.

At the end of the process described and claimed in the present text, the compositions obtained can be subjected to further polymerization, after being previously treated, in order to complete the polymerization and thus to form polymeric composites, polymeric nanocomposites or master batches.

Before proceeding with the further polymerization, in fact, the final composition containing graphene and graphene nanoplatelets dispersed in a solvent can be treated according to various procedures.

In a first procedure, said final composition can be left to decant to allow the non-exfoliated graphite material to settle, forming a sediment, and thus separating a first liquid phase containing graphene and graphene nanoplatelets. After the decanting phase, the first liquid phase separated (first supernatant) can be subjected to centrifugation at a rate sufficient for further separating a second liquid phase containing graphene and graphene nanoplatelets, from the non-exfoliated graphite material.

In a second alternative procedure, the final composition containing graphene and graphene nanoplatelets dispersed in a solvent, after the sonication treatment, is directly subjected to centrifugation, without prior decanting, separating a final liquid phase containing graphene and graphene nanoplatelets, from the non-exfoliated graphite material.

During the decanting, said final composition is left to settle for a period of time equal to at least 2 minutes, preferably longer than or equal to 20 minutes, even more preferably at least an hour, thus forming a sediment.

The centrifugation rate can vary from 500 rpm to 30,000 rpm, for a time ranging from 2 minutes to 60 minutes. The centrifugation can be carried out batchwise, semi-batchwise and in continuous. In a semi-batch mode, the final composition coming from the sonication treatment, or the first liquid phase separated after decanting, is charged batchwise into the centrifuge, from which a second liquid phase (second supernatant) is extracted continuously.

In the case of continuous centrifuges, on the other hand, the final composition coming from the sonication treatment or the liquid phase separated after decanting which must be centrifuged, is fed continuously into the centrifuge, and at least a second liquid phase (second supernatant) is extracted continuously.

After decanting and/or centrifugation, the first, the second liquid phase or the final phase, containing graphene and graphene nanoplatelets durably dispersed in a solvent, separated according to the procedures previously described, and possibly added of further additives, are brought to the desired temperature in order to complete the polymerization, forming polymeric composites, polymeric nanocomposites or polymeric master batches containing the compositions described and claimed in the present patent application. Said compounds prove to have high mechanical performances, a high thermal resistance, antistatic capabilities, electromagnetic insulation properties, and a high thermal conductivity.

The further additives are selected from flame-retardant agents, self-extinguishing agents, synergizing agents, nucleating agents, lubricants, pigments, antacids and radical scavengers.

Expandable polymeric composites or expandable polymeric nanocomposites can be obtained from the polymeric composites, polymeric nanocomposites or polymeric master batches containing graphene and graphene nanoplatelets, by adding an expanding agent which is preferably selected from pentane or a mixture of pentane isomers, and said expanding agent preferably ranges from 3% to 8% by weight with respect to the weight of the expandable polymeric nanocomposite.

A further object of the present patent application therefore relates to expandable polymeric composites or expandable polymeric nanocomposites containing the polymeric composites or polymeric nanocomposites or master batches previously described and at least one expanding agent.

Articles and expanded polymeric foams having a high thermal insulation capacity, thermal resistance and high mechanical performances, can be prepared starting from said expandable polymeric composites or expandable polymeric nanocomposites.

The polymerization process takes place according to procedures known in the state of the art, such as, for example, suspension polymerization, emulsion polymerization, solution polymerization or continuous mass polymerization.

In the case of suspension polymerization and emulsion polymerization, as described in U.S. Pat. No. 4,231,919 and in U.S. Pat. No. 3,898,300 incorporated in the present patent application as reference, the first or second liquid phase, separated according to the procedures previously described in the present text, can be added to the system which comprises a suspending agent and an emulsifying agent, for example water and suitable suspending agents and emulsifying agents, forming a product already in the form of solid particles or granules in which all of the monomer is substantially reacted. A polymeric composite, or a polymeric nanocomposite is thus formed, possibly concentrated (master batch) in granules.

In the case of continuous mass polymerization, as described for example in U.S. Pat. Nos. 6,348,549 and 2,593,399, incorporated in the present patent application as reference, the first or second liquid phase, separated according to the procedures previously described in the present text, can be polymerized in the molten state. The polymer obtained, after possible removal of the solvents and volatile products, is then extruded and cut into granules (strand cut).

Alternatively, the molten polymer is passed through a die plate in which there are a plurality of holes, and granulated at the head, for example with granulators of the water ring type, such as those described in WO 2007/048536, incorporated in the present patent application as reference, thus obtaining a polymeric composite, or a polymeric nanocomposite, possibly concentrated (master batch) in granules.

The resulting product can be used directly in the production of intermediate articles or products for enhancing their mechanical, electrical, thermal insulation properties. A polymeric nanocomposite, for example, can be extruded, forming an article by injection or compression moulding. A resulting polymeric nanocomposite can also be possibly used as a concentrate (master-batch) for the subsequent production of the intermediate articles and products previously mentioned.

The polymeric composites, polymeric nanocomposites or polymeric master batches thus obtained, can preferably be used for the production of expandable polystyrene (EPS) having a high thermal insulation, according to any of the methods known in the state of the art, for example suspension polymerization, as described for example in U.S. Pat. Nos. 2,673,194, 4,500,692, EP 2475709, incorporated in the present patent application as reference, or continuous mass polymerization.

During the continuous mass polymerization, the polymeric nanocomposite can be added to other components such as polystyrene, flame-retardant agents and relative synergizing agents, expanding agents, possible nucleating agents and other athermanous agents. The components are mixed, for example by means of static mixers, possibly brought to a reference temperature (for example, 170° C.), and then fed to a die plate on which there are a series of holes through which the composition is extruded. The composition leaving the holes of the die plate, is granulated, for example by means of a series of rotating knives, and subjected to adequate cooling, for example by means of water or another cooling fluid, to allow the cutting of the expandable polymeric composition into granules. For example, said granulators can be of the underwater cooling type, or water jet type exiting from a plurality of spray nozzles, as described in U.S. Pat. No. 7,320,585, incorporated in the present patent application as reference. For a more detailed description, reference can be made to patent applications WO 2003/053651, WO 2008/141766 and WO 2008/141767, incorporated in the present patent application as reference.

The process, object of the present invention, can be carried out in continuous mode or in batch mode. FIGS. 1-9 illustrate both of the modes as preferred embodiments of the present invention.

Figure 1:
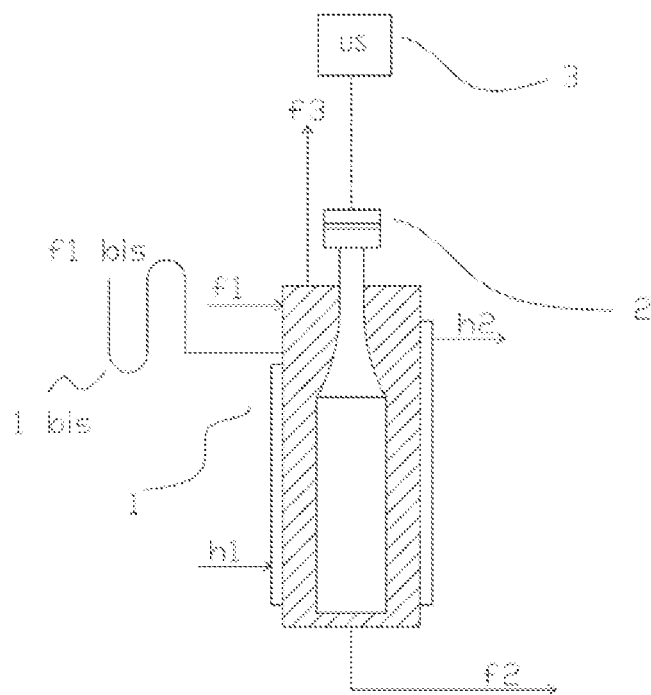
FIG. 1 shows the process according to the present invention in batch mode.

FIG. 1 describes the process of the invention in batch flow mode. The starting composition is prepared in a beaker or other container suitable for the purpose (not indicated in FIG. 1), in which the graphite material, the main solvent comprising at least 10% by weight of a vinyl aromatic monomer, and the possible other further additives, are put in contact and mixed by means of a mechanical or magnetic stirrer.

Once the starting composition has been prepared, it is introduced, through the stream f1, into a suitable device (1), capable of resisting the pressure envisaged for the ultrasound treatment. The ultrasounds are applied directly to the starting composition for the time predicted, by means of the sonotrode (2) connected to the ultrasound generator (3), after which the treated composition is removed from the bottom of the device (f2).

In the batch mode of the process, the device (1) is loaded with the starting composition to be treated until the whole volume of the device has been filled, and therefore without the presence of gas. The pressurization of the device is effected according to one of the procedures previously described, such as, for example: by feeding the composition by means of a pump, which therefore pressurizes the whole container (1), or by applying the direct or indirect expansion tank pressurization device previously described in the text, connected to the device (1) for example by means of an opening (f3) on the roof of the container. In particular, the sonication chamber and the direct expansion tank can be integrated in a single unit, with the use of a liquid surge fluid as previously described. In this case, the expansion tank can advantageously occupy the upper part of the container (1) whereas the sonication chamber occupies the lower part, so as to facilitate the degasification of the composition.

FIG. 1 shows a further flow called "f1 bis" through which the direct expansion tank pressurization can be effected. For this purpose, the system is provided with a siphon (1 bis). Said siphon is filled with the composition itself by passing it from the container (1) through the stream "f1 bis", so as to remove the gas present therein. The siphon "1 bis" is connected through the stream "f1 bis" to an Argon cylinder so as to pressurize the container (1), at the same time preventing the gas (Argon) from entering the container (1). The same connection not only allows pressurization, but also allows keeping the pressure constant during the whole ultrasound treatment process (by absorbing, for example, the thermal expansions). The siphon system described herein is therefore a direct expansion tank mode in which the surge fluid is the composition itself.

The temperature regulation can be effected by means of any method known in the art. The device of FIG. 1, for example, can be equipped with a jacket for the temperature regulation. A diathermic fluid (h1, h2), regulated by an external temperature control unit, circulates in the jacket.

The starting composition loaded into the device (1) is subjected to a continuous, or pulsed, ultrasonic field. As already previously described, in the batch mode, the pulsed mode is obtained by modulating the generation of sound waves in time cycles: the transducers of the sonotrode are excited by the electric/magnetic field for a limited time, hereinafter defined as "active" period, followed by a time in which there is no excitation of the active material, or the excitation itself is extremely reduced, defined as "passive" period.

The device (1) can be optionally provided with a stirring system (not indicated in FIG. 1). Said stirring system is preferably obtained by circulation of the starting composition through a pump, or with a stirrer positioned inside the container itself.

The device (1) can be advantageously equipped with an emergency evacuation system (not indicated in FIG. 1), an injection system of an inert liquid to prevent run-away reactions, a sample-taking system, or in any case other management systems known in the art.

The gas present in (1) before the introduction of the solution, can be removed from an opening (f3) made on the top of the container. The pressure regulation can be effected by the supply pump, and/or by withdrawing a quantity of the solution from the top (f3) or bottom (f2) of the device. Once the ultrasound treatment has terminated, the treated composition can be immediately removed by replacing the same volume with an equal volume of gas or a liquid, i.e. it can undergo decanting treatment in the same device (1). After decanting, two phases, an upper phase and a lower phase, are formed: the product is removed from the part of the upper phase by means of a nozzle applied on the side part of the device (not indicated in FIG. 1), or using a dip tube. The remaining lower phase, stratified on the bottom of the device, is then disposed of or re-used in the subsequent batch.

In addition to decanting, or as an alternative, a concentration treatment can be effected, which consists in evaporating part of the solvent, subsequently eliminating the vapours thus produced, and collecting the concentrated product. This operation can be carried out both in the device (1) and also apart, in apparatuses suitable for the purpose.

Figure 2:
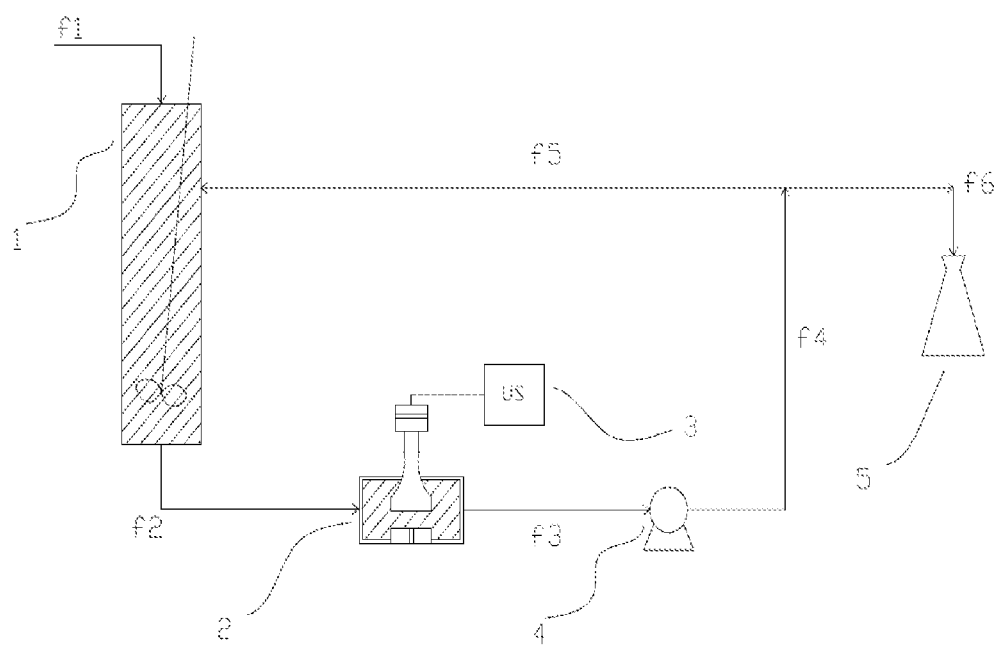
FIG. 2 shows the process according to the present invention in continuous mode, wherein the pump (4) is downstream of the sonication chamber (2).
Figure 3:
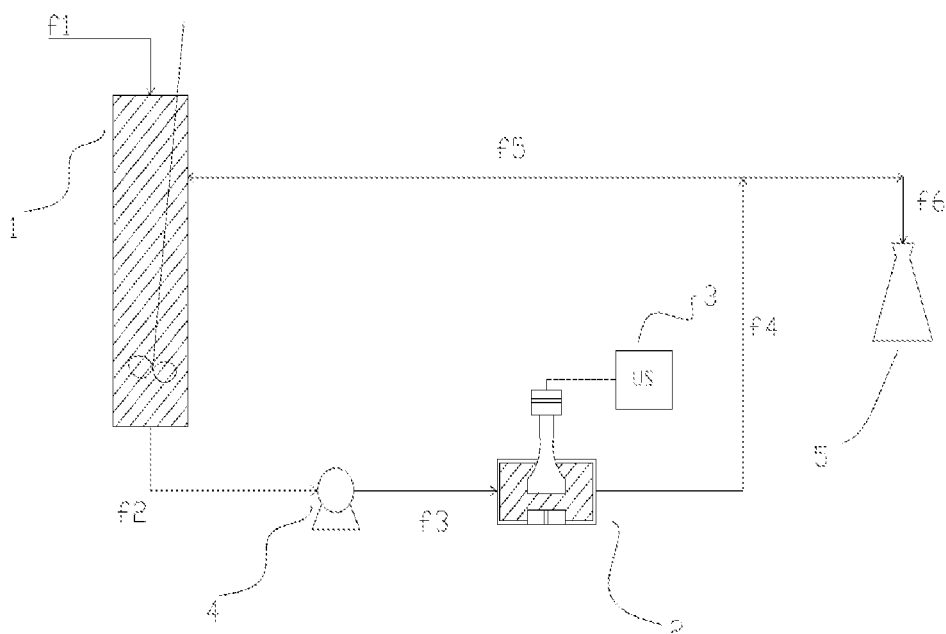
FIG. 3 shows the process according to the present invention in continuous mode, wherein the pump (4) is upstream of the sonication chamber (2).

FIGS. 2 and 3 describe the process according to the present invention carried out in a continuous flow mode. The initial composition is loaded into the device (1), through stream f1, and pumped by means of a pump (4) into the device in which the ultrasound treatment (2) takes place (connected to the ultrasound generator, 3), through streams f2 and f3. Downstream of the ultrasound treatment (f4), the composition then returns to the device (1), through stream f5, and is recirculated inside the circuit. This circuit therefore forms the sonication loop. The pump (4) can be positioned upstream (FIG. 3) or downstream (FIG. 2) of the device in which the ultrasound treatment (2) is carried out. At the end of the ultrasound treatment, the treated composition is collected in a suitable container (5), through stream f6.

The container (1) can be optionally provided with a stirring system, as shown in FIGS. 2-9. Any stirring system known in the art can be used, for example internal rotating stirrers such as propellers, impellers or anchor or ribbon stirrers, actuated by a motor connected to them; or a stirring element moved by a suitable external magnetic field, such as, for example, an anchor.

If the pump is positioned upstream of the ultrasound treatment device (as in FIG. 3), a check valve can be applied downstream of the latter, or a pressure relief valve, to ensure that the starting composition remains at a predetermined pressure during the ultrasound treatment, which is higher than the pressure of the same device (1).

This, for example, allows a reduction in cost and also simplifies the construction of the device (1), as the same can be designed at a lower pressure or even at atmospheric pressure.

FIG. 4 describes a process again carried out in continuous mode similar to that reproduced in FIG. 3, and has one or more heat exchangers (6) downstream of the ultrasound device (2), for regulating the temperature of the composition treated, by means of diathermic fluid (h3, h4). A first exchanger, for example, could enable the mixture to be heated by bringing it to the desired process temperature before the activation of the ultrasounds, whereas a second exchanger, with water or cooling mixture, can enable the temperature to be lowered in the case of uncontrolled incipient polymerization (run-away).

There are no particular restrictions on the type of exchangers to be used; however, exchangers in which the cleaning operation is simple are preferred, such as, for example tube-in-tube exchangers or tube-bundle exchangers in which the process fluid passes on the tube side. Also in this case, downstream of the ultrasound treatment and passage in the heat exchanger the composition (f5) returns to the device (1) through the stream f6. At the end of the ultrasound treatment, the treated composition is collected in a suitable container (5), by means of stream f7.

Figure 5:
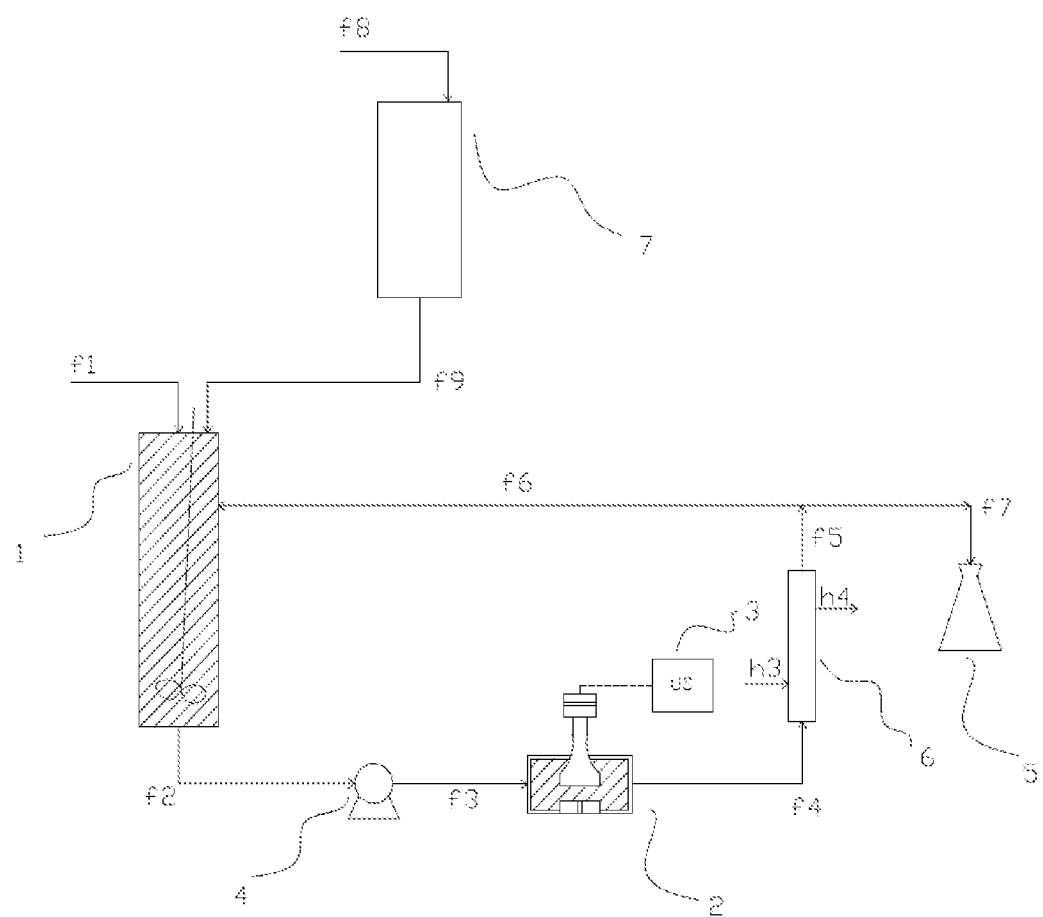
FIG. 5 shows a configuration similar to that of FIG. 4 but also has a tank for an emergency fluid (7).

A further embodiment mode, called "with emergency flushing", is represented in FIG. 5. This mode envisages the presence of a storage tank (7) containing an emergency fluid, charged through stream f8, which is preferably the main solvent. In the case of run-away reactions, the introduction of this fluid into the circuit, through stream f9, allows a decrease in the viscosity of the system and a decrease of the temperature, preventing any possible blockages in the circuit and pump. These blockages may arise as a result of the polymer which is formed due to an uncontrolled temperature increase. For the use of the emergency flushing system, it is preferable for the solution to be able to be rapidly discharged into a collection tank, called drainage tank (9), visible in FIG. 6, so that the flushing solution can substitute the run-away solution inside the circuit and relative equipment. For this purpose, either manual or automatic valves can be provided, which allow the flow of the solution to be opened towards the drainage tank (9) (see connections a, b, c, d, and from the sonication loop towards the drainage tank (9)) and, previously, simultaneously, or subsequently, opening the valve on the emergency storage tank (7). The emergency storage tank (7) is advantageously kept at a pressure higher than the pressure of the circuit, in order to favor the rapid substitution of the solvent also in the absence of electric energy. Alternatively, or simultaneously, a pumping means can be provided, such as, for example, a gear pump, in order to facilitate the transfer of the emergency fluid into the solution.

The drainage tank (9), in addition to allowing the evacuation of the circuit in a closed loop, it has the function of containing all of the purges of the system, typically situated in the highest and lowest points of the circuit, and upstream and downstream of the circulation pump, which are effected for eliminating any possible bubbles of gas present in the starting composition or which can be englobed during the charging operations. Advantageously, during the ultrasound treatment, these purges can be temporarily opened for removing the further gaseous phase possibly generated during the process. During the ultrasound treatment, in fact, there may be the generation of a gaseous phase deriving from the gas originally dissolved in the composition or generated during the same.

Figure 6:
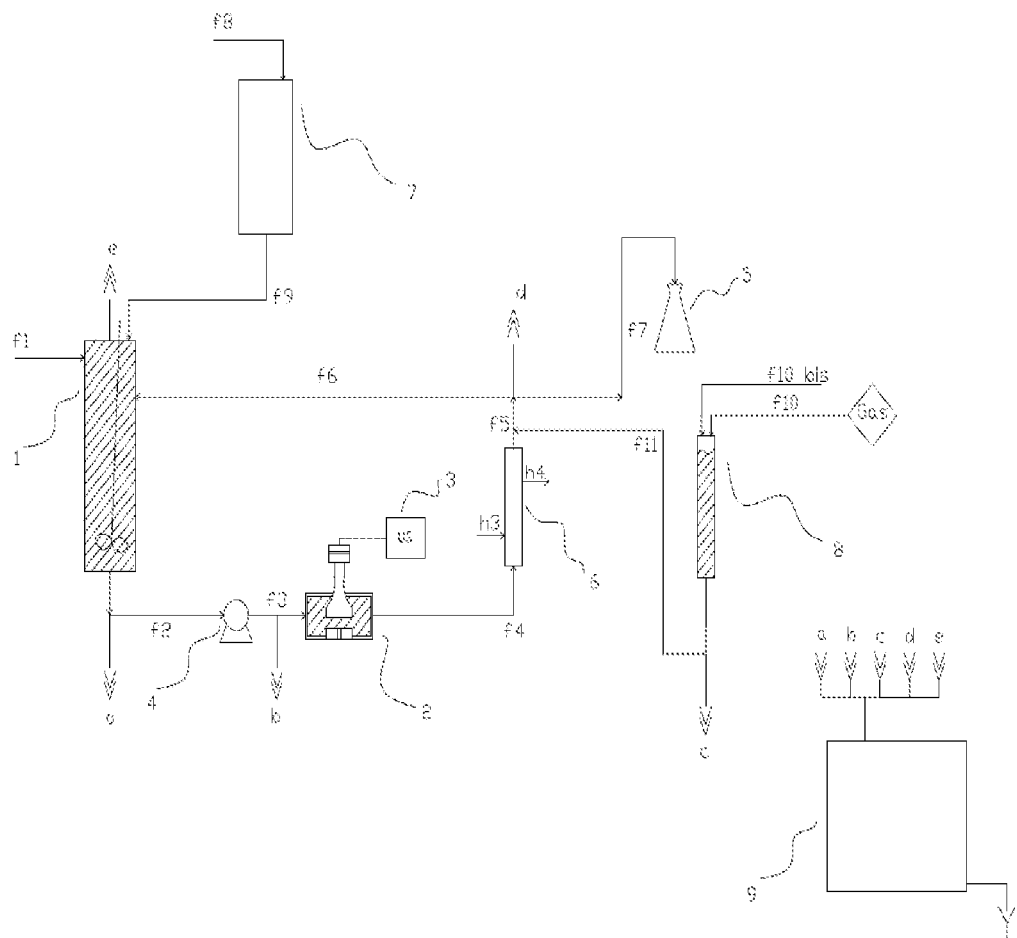
FIG. 6 shows a configuration similar to that of FIG. 5 but also has a pressurization tank (8) and a drainage tank (9).

The embodiment mode represented in FIG. 6 provides for the pressurization of the circuit with the use of an expansion fluid put in contact with the process fluid (f11) by means of a special pressurization tank or equivalent system (8), wherein the expansion fluid comes into contact with the gaseous phase. As already described, this pressurization tank or equivalent system, can consist of a simple pipe positioned vertically. Said expansion fluid is interposed between the composition and the stabilization gas (f10), charged by means of the stream f10 bis, to prevent the dissolution of the gas in the liquid phase of the process fluid (as the expansion fluid is stationary, the diffusion of the gas dissolved inside the surge fluid towards the process fluid is extremely slow and, in fact, negligible).

Figure 7:
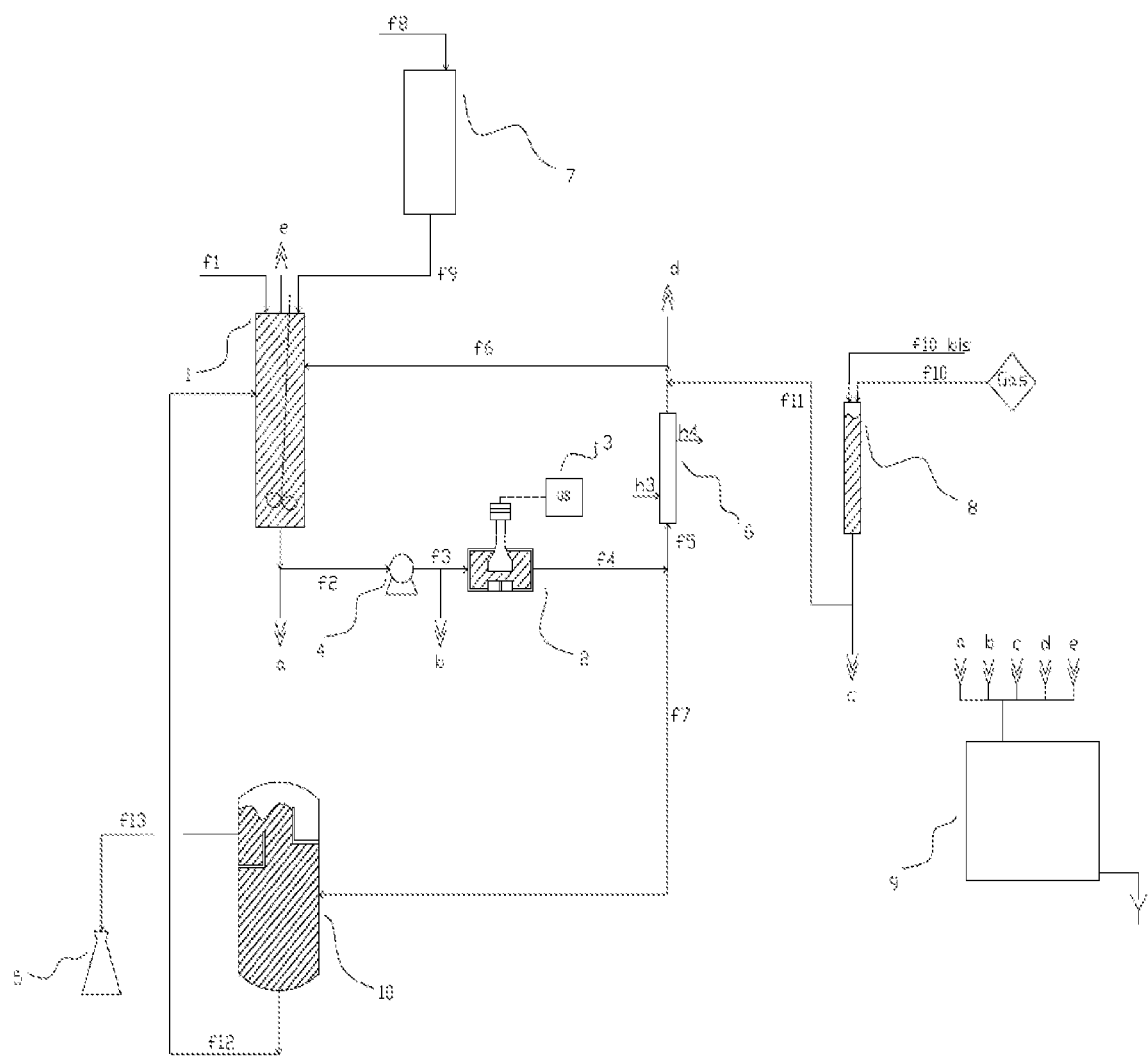
FIG. 7 shows a configuration similar to that of FIG. 6 but also has a settling tank (10).

Another embodiment represented in FIG. 7 envisages the presence of a second device (10) situated downstream of the main circuit (sonication loop) which comprises the device in which the ultrasound treatment (2) takes place, the loading tank (1), the pump (4) and the heat exchanger (6). Said device (10) acts as a decanter.

The treated composition can be fed to the decanter at the end of the ultrasound treatment, or continuously. In the latter case, a portion of the fluid leaving the sonication chamber (2) is carried by the stream f7 to the decanter (10), whereas the remaining part passes through the exchanger (6) and is recirculated again in the sonication loop. The treated composition (f7) can remain in the decanting device (10) so that the non-exfoliated particles of graphite material are settled on the bottom, whereas those mostly exfoliated that remain in suspension can be easily collected in the upper part of the same, preferably through suitable septa present inside the device (10).

The part deposited is recovered from the bottom of the container (10) and can be advantageously recycled to the loading tank (1), by means of the stream f12, to be re-subjected to ultrasounds. The treated composition is recovered in a container suitable for this purpose (5), by means of stream f13.

Figure 8:
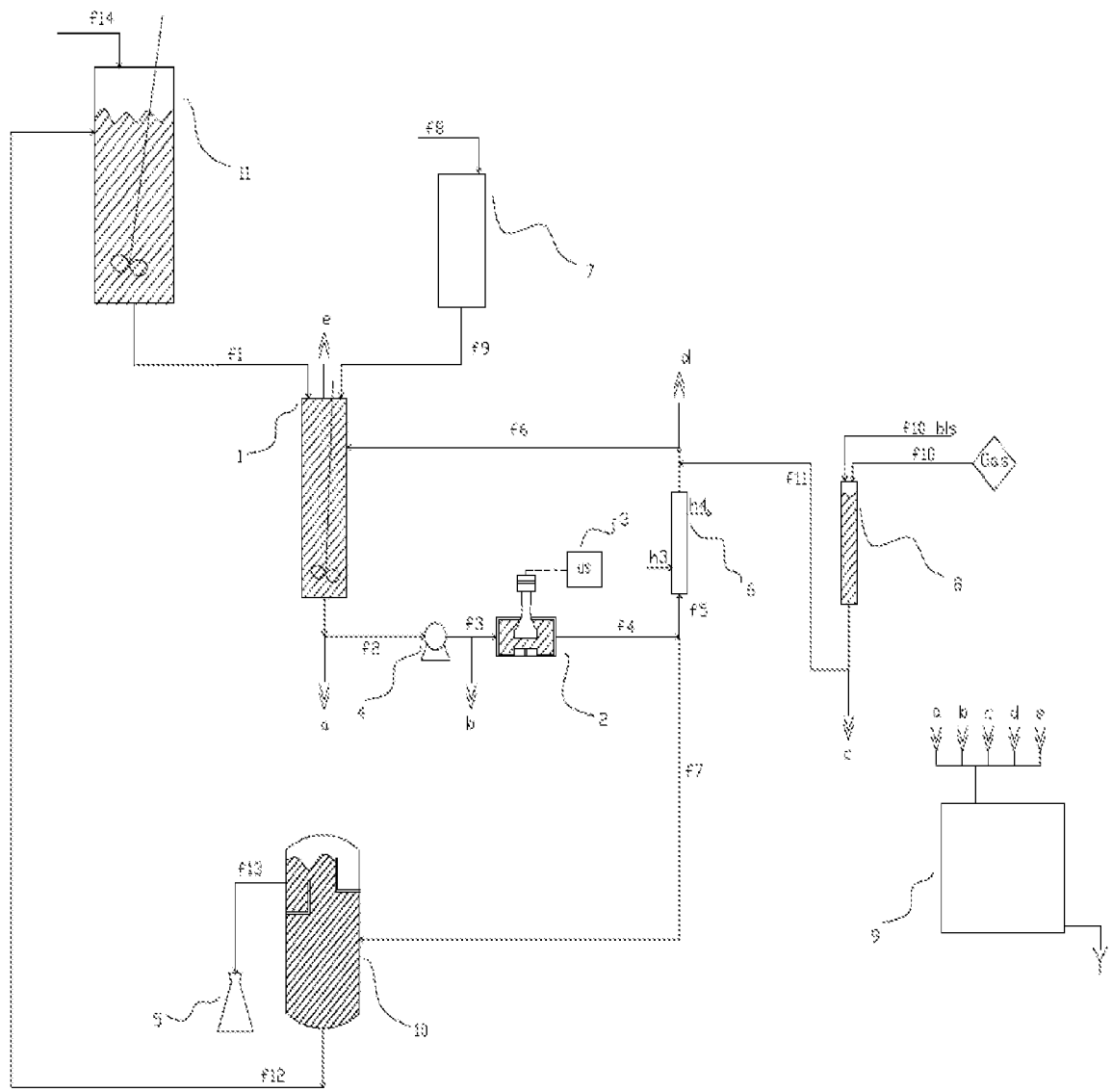
FIG. 8 shows a configuration similar to that of FIG. 7 but also with a storage tank (11).

A further embodiment represented in FIG. 8 provides for the presence of a storage tank (11) having a much greater volume than that of the main circuit (sonication loop), for example, two times higher, more preferably ten times higher, which has the function of storing the composition to be treated, loaded into said tank by means of stream f14. The composition to be treated is gradually fed to the loading tank (1), through the stream f1, by means of a feeding device, such as, for example, a gear pump, and then treated with ultrasounds. A part of the fluid, possibly equal to the part transferred from the tank (11) to the main circuit, so as to keep constant the volume of the liquid phase of the same, is then collected and sent to the decanting device (10) through stream f7.

From the decanting device (10) the composition treated in the upper part of the same (f13) is withdrawn and collected in a container suitable for the purpose (5). The solution containing the non-exfoliated part of graphite material is instead disposed of from the bottom of the decanting device (10) or, advantageously, recycled back into the device (11) so that it is subjected again to the ultrasound process (f12).

The presence of the tank (11) allows the use in continuous mode for longer times, in addition, of course of being able to treat a larger volume of composition.

As an alternative to the storage tank (11), any device capable of feeding the composition to the main circuit can be used. For example and advantageously, by putting the graphite material in contact with a solvent comprising at least 10% by weight of a polymerizable monomer, the preparation of the composition can be effected directly upstream of the sonication loop, also in continuous mode, by means of tanks equipped with a mixing system or static mixers. In this way, the whole process is completely continuous.

A further embodiment mode represented in FIG. 9, provides for the further presence of a container (12), referred to hereinafter as the concentrator, in which (f13) receives the supernatant coming from the settling tank (10). Part of the most volatile solvents are vaporized in the concentrator (12) and eliminated through an outlet (g) positioned in the upper part of the same, so that the concentration of GRS in the composition (f15) leaving the concentrator is increased.

The concentration can be obtained according to any of the methods known in the art. The concentration, for example, can be obtained by the injection of a gas, so as to effect a stripping of the most volatile solvents. Alternatively or in combination therewith, the concentration can be obtained by bringing the composition in (12) to a higher temperature, or again, alternatively or in combination therewith, by reducing the pressure in (12).

According to the present invention, the concentration is preferably carried out by stripping using an inert gas, typically nitrogen, and reducing the pressure to a lower value, typically 100 mBar.

The concentrator (12) is preferably maintained at a constant temperature, for example the same temperature as the composition in (10), by means of a jacket in which a regulating heat-transfer fluid is circulated. The gases extracted (g) can be possibly condensed and re-used, for example re-fed to the feed mixing container (11). The concentration in (12) allows the concentration of GRS in the composition to be increased by at least 20%, more preferably by at least 50%, even more preferably by at least 100%.

The schemes can also comprise further elements, which forms part of the state of the art, such as for example: filtering the solution to the pump suction, pressure transducers, temperature, flow meters, supervision and control system and whatever a skilled person in the art may consider useful to be introduced.

Some examples are provided hereunder a better understanding of the invention and application scope, although in no way representing any limitation to the scope of the present invention.

For the sake of brevity, the term "parts" refers hereunder to parts by mass, "g" or "gr" to grams and "l" or "lt" to liters.

Example 1

Figure 4:
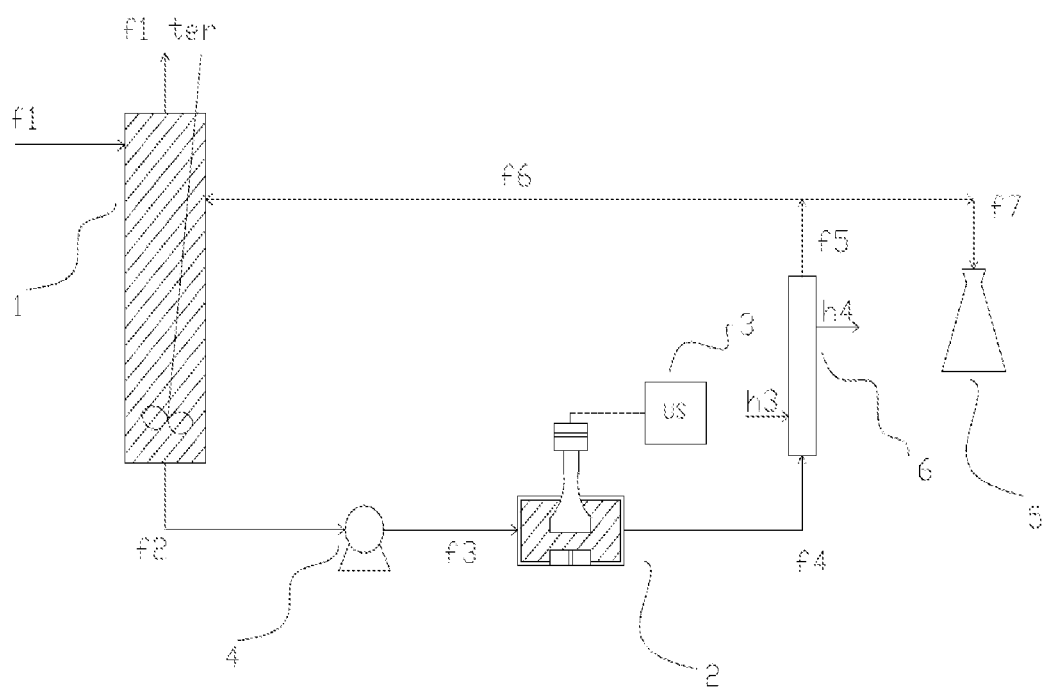
FIG. 4 shows the process according to the present invention in continuous mode, wherein the pump (4) is upstream of the sonication chamber (2) and a heat exchanger (6) is downstream of the sonication chamber (2).

In this example, the process is described for the preparation of the composition containing graphene and graphene nanoplatelets according to the continuous flow mode, as represented in FIG. 4.

2 parts of commercial synthetic graphite SFG6 produced by Timcal are dispersed in 98 parts of styrene (Sigma Aldrich) by means of a magnetic anchor stirrer at room temperature for 15 minutes, so as to obtain a homogeneous composition of graphite in the liquid.

The stirring is then stopped and the composition is immediately charged into the loading tank (1) at room temperature, by means of a pump (not shown in the figure). The circulation pump (4) is simultaneously started. During the charging, the gas initially contained in the sonication loop is continuously extracted (f1 ter) by means of a nozzle positioned in the upper part of the container (1), so as to completely fill the container (1) with the composition. The charging of the composition is terminated when the composition begins to flow out of the container (1) through the stream "f1 ter".

Once the charging of the composition has been completed, the stream "f1 ter" is intercepted and the feeding pump is actuated so as to increase the pressure of the container (1) up to a value of 13 bar absolute.

The purge valve, positioned in the highest point of the sonication loop, is partially opened for a few seconds to remove the entrapped gas, and the pump is activated to bring the pressure back to 13 bar absolute. The operation is repeated on the drain valve from which the sampling (5) will be effected. The ultrasound generator (3) is then started in a continuous mode, by means of a sonotrode at a frequency of 20 kHz and with a specific power of about 100 W/cm$^3$, constant (and therefore not modulated) with time. The pump (4) which feeds the composition to the chamber in which the ultrasound treatment (2) is effected, is regulated by means of a frequency converter, so that the residence time in the ultrasound treatment chamber, calculated as the volume of the chamber divided by the volumetric flow-rate of the processed solution, is 0.15 seconds. The residence time in the loading tank (1), and in the other apparatuses forming the sonication loop (in which the composition is continuously circulated), again calculated as the total volume/volumetric flow-rate ratio, is equal to 15 seconds. The duty cycle is therefore equal to about 1%. Downstream of the ultrasound treatment device (2), the heat exchanger (6) provides for the temperature regulation. The overall time of the treatment is equal to 7,200 seconds. Consequently, the actual sonication time is 72 seconds. The test is carried out at a constant pressure, starting from room temperature (20° C.) and increasing the temperature by about 2 degrees per minute for the first 30 minutes, then about 1 degree per minute for the subsequent 30 minutes, and then about 0.5 degrees per minute for the following 60 minutes, until a temperature of 140° C. is reached at the end of the test. The temperature increase is mainly due to the absorption of the ultrasound waves by the process fluid in the sonication chamber. The increase in temperature would in any case be higher except that part of the heat supplied is dissipated due to thermal losses towards the environment.

At the end of the test, the mixture is cooled by means of the exchanger (6), keeping the circulation pump (4) running continuously. When the temperature has reached 90° C., a sample is collected in a suitable container (5) and is left to decant for 24 hours to allow the possible non-exfoliated graphite material to settle on the bottom. The sample collected from the supernatant of the sample left to decant (about 40% by weight) is called "Product 1A".

The "Product 1A", obtained from the previous decanting, is subjected to centrifugation (centrifuge model Sorvall Evolution RC, with a maximum number of revs of 25,000 rpm) at 8,000 rpm for 30 minutes, in order to remove the graphite material that has not completely exfoliated. At the end of centrifugation, the supernatant called "Product 1B" is collected, this is the final product of the sonication process, partially polymerized.

The "Product 1B" is subjected to stripping of the residual styrene by means of the Vacuum Oven System (VOS), in order to determine the percentage of solids of the sample, i.e. of the polymer formed and graphene and graphene nanoplatelets present. The VOS is essentially a heated device in which a small quantity of the "Product 1B" (about 3 grams) is inserted for 30 minutes at a temperature of 230° C. The pressure is brought to 600 mbar for 10 minutes, then to 400 mbar for a further 10 minutes and finally to 50 mbar for the remaining time of the test. The polymeric nanocomposite product thus obtained is called "Product 1C". In said "Product 1C" the non-reacted residual monomer is removed; the method described (VOS) is a possible mode for obtaining the final polymeric nanocomposite product.

The ratio between the weight of the final (dry) sample ("Product 1C") and the initial sample fed to the VOS ("Product 1B") is called percentage or, equivalently, solid fraction. The solid fraction, which proved to be about 18% by weight, represents the percentage of polymer and GRS present in the supernatant.

A thermo-gravimetric analysis (TGA) was carried out on the Product 1C, to obtain the percentage of GRS.

For this purpose, the sample was heated from room temperature to 600° C. in a nitrogen atmosphere, at a rate of 50° C./min (during this step, the polymeric matrix is eliminated) and subsequently from 600 to 850° C. in air, again at a rate of 50° C./min, in this step there is the combustion of inorganic carbon in air, i.e. GRS, as this is the only inorganic carbon material present. The percentage of carbon is calculated from the loss in mass which takes place after changing from a nitrogen atmosphere to air, i.e. the difference between the mass at 600° C. in a nitrogen atmosphere and that at 850° C. in air. This value proved to be equal to 1.2% by weight. The percentage of GRS in "Product 1B" with respect to the total is therefore equal to 0.22% by weight, i.e. equal to a concentration of about 2.2 g/l.

The "Product 1B" was analyzed by means of transmission electron microscope (TEM), in order to verify the exfoliation degree obtained. One of the TEM images obtained is shown in FIG. 10. The same product was also subjected to atomic force microscopy (AFM) thus verifying that the GRS obtained has a thickness not exceeding 10 nm.

The remaining "Product 1A" was left to rest for 30 days in a second container, closed and transparent, and did not show any visible sedimentation. This suggests that also "Product 1A" is already a concentrated and stable suspension.

Example 2

Example 1 is repeated but using 0.05 parts of initiator Perkadox BC-FF (produced by AkzoNobel), 2 parts of graphite SFG6 and 97.95 parts of styrene, obtaining "Product 2A" after decanting, "Product 2B" after centrifugation and "Product 2C" after stripping the residual styrene, analogously to what is described in Example 1. The "Product 2B" was subjected to TEM analysis: from the photos (FIG. 11), a good exfoliation degree can be observed. It was also estimated, through AFM, that the GRS has a thickness not greater than 10 nm. The concentration of GRS in "Product 2B" was determined by means of the same method described in Example 1 and thermo-gravimetric analysis (TGA): the result is 2.5 g/l. The solid fraction proved to be equal to 22%.

Example 3

Example 1 is repeated but using 0.2 parts of initiator Perkadox BC-FF, 2 parts of graphite SFG6 and 97.8 parts of styrene, obtaining the "Product 3A" after decanting, "Product 3B" after centrifugation and "Product 3C" after stripping, analogously to what is described in Example 1. As for Examples 1 and 2, TEM and AFM analyses were carried out and the concentration of GRS was determined according to the same procedures adopted for the "Product 3B". From the AFM analysis of the "Product 3B", it can be estimated that the GRS has a thickness not greater than 10 nm, whereas the concentration in the "Product 3B" is 4 g/l measured according to the same method described in Example 1 and thermo-gravimetric analysis (TGA). The solid fraction proved to be equal to 25%. Also in this case, "Product 3A" was left to rest in a second closed and transparent container. The result was a stable and concentrated suspension which, after 30 days did not show any evident signs of sedimentation.

Example 4

Example 1 was repeated but using a composition composed of 10 parts of polystyrene Edistir N1782 (Mw=180,000 g/mol; MFI (200° C., 5 kg)=7.5 g/10'), 2 parts of commercial synthetic graphite SFG6 produced by Timcal and 88 parts of styrene (Sigma Aldrich). "Product 4A" was obtained after decanting, "Product 4B" after centrifugation and "Product 4C" after stripping analogously to what is described in Example 1. The "Product 4B" was subjected to TEM analysis as can be seen in FIG. 12. Also in this case, an AFM analysis was carried out, estimating a thickness of the GRS not greater than 10 nm. The concentration of GRS on "Product 4B" is 3 g/l and is obtained using the same method described in Example 1 and thermo-gravimetric analysis (TGA).

Example 5

Example 1 is repeated but using 0.05 parts of initiator Perkadox L-W75 (produced by AkzoNobel), 2 parts of graphite SFG6, 30 parts of ethylbenzene and 67.95 parts of styrene.

"Product 5A" was obtained after decanting, "Product 5B" after centrifugation and "Product 5C" after stripping, analogously to what is described in Example 1. The "Product 5B" was subjected to TEM analysis. It was also esteemed, through AFM, that the thickness of the GRS is not greater than 10 nm. The concentration of GRS, calculated on the "Product 5B", obtained using the same method described in Example 1 and thermo-gravimetric analysis (TGA), is about 1.1 g/l.

Example 6

This example describes a method for preparing the polymeric nanocomposite.

A part of "Product 1B" is inserted in a glass autoclave equipped with a stirrer. The solution was heated to 120° C. and kept at this temperature, under vacuum, for about 1 hour. The percentage of solid products, again measured with the method described in Example 1, proved to be 35%.

The product thus obtained is then inserted in a steel cylinder positioned in an oven and kept at a temperature of 150° C. for 3 hours, so as to complete the polymerization. The product obtained is then put under vacuum (50 mbar absolute) for 30 minutes at a temperature of 230° C. in order to eliminate any possible residual styrene. The material thus obtained, called "Product 1D" is cooled, extracted from the cylinder and crushed. The material is subjected to thermogravimetric analysis (TGA) according to the procedures described in Example 1, and the quantity of GRS present was obtained, equal to 1%.

The material can be subsequently processed by means of the usual technologies used in the field of the transformation of polymeric materials, such as, for example, extrusion, injection moulding, compression moulding.

Example 7

Example 1 was repeated but, after charging the solution into (1), starting the pump (4) and pressurization, the composition is brought to a temperature of 80° C. by means of the heat exchanger (6), keeping it constantly in circulation by means of the pump (4), before starting the ultrasounds. Products 7A were obtained after decantation, 7B after centrifugation and 7C after stripping, analogously to what is described in Example 1.

The percentage of GRS in "Product 7B" with respect to the total is 0.25% by weight, obtained by using the same procedure described in Example 1 and thermo-gravimetric analysis (TGA). The solid fraction proved to be equal to 24%.

Example 8

Example 1 is repeated but effecting the pressurization by means of an expansion fluid contained in the pressurization tank (8), according to the scheme shown in FIG. 6.

For this purpose, the pressurization tank (8) is filled with styrene (the surge fluid used) through stream (f10 bis). During the charging of the composition (stream f1), the pump (4) is activated and the gas initially contained in the sonication loop, is continuously extracted from a nozzle positioned in the upper part of the container (1) (stream "e"), maintaining the receiving container (9) under vacuum by means of a dedicated pump (not shown in the figure). The valve is then opened on the stream (f11) to put the expansion fluid in contact with the composition. The valves on the flows (a), (b) and (d) are also opened for short periods, to eliminate any possible gas pockets, so as to completely fill the sonication loop with the composition. Pressurization is then effected by feeding Argon gas (pressurization gas) through stream f10, the ultrasound generator is started and the pump (4) regulated, again as indicated in Example 1. The test was then carried out with the same thermal profile and treatment time as in Example 1. The pressure used was equal to 13 bar absolute.

Also in this case, a stable suspension is obtained, without any visible sedimentation after 30 days. The "Product 8A" was then obtained after decanting, "Product 8B" after centrifugation and "Product 8C" after stripping, analogously to what is described in Example 1. The concentration of GRS in the "Product 8B", determined according to the same procedure described in Example 1 and thermo-gravimetric analysis (TGA), proved to be equal to 0.25% by weight.

The TEM photographs show a good exfoliation degree, and AFM analysis shows the presence of GRS with a thickness not exceeding 10 nm.

Example 9

Example 8 is repeated but using a pressure of 8 bar absolute. The "Product 9A" was thus obtained after decanting, "Product 9B" after centrifugation and "Product 9C" after stripping, analogously to what is described in Example 1. The concentration of GRS in the "Product 9B", obtained using the same method described in Example 1 and thermo-gravimetric analysis (TGA), proved to be equal to about 0.06% by weight.

Example 10

Example 8 is repeated but using a pressure of 21 bar absolute. The "Product 10A", "Product 10B" and "Product 10C" were then obtained following the methods already described in Example 1. The concentration of GRS in "Product 10B", obtained using the same method described in the previous examples, proved to be equal to about 0.15% by weight.

Comparative Example 1

Example 1 is repeated without effecting pressurization and therefore maintaining atmospheric pressure for the whole duration of the test. At the end of the treatment, the solution is extracted in a transparent container. After 1 hour, the solution in the container proved to be completely separated into two phases, wherein substantially the whole graphite material was deposited on the bottom (FIG. 14, container on the left).

Example 11

Example 1 is repeated but with a specific sonication power of about 500 W/cm³. "Product 11A" was obtained after decanting, "Product 11B" after centrifugation and "Product 11C" after stripping, analogously to what is described in Example 1. The concentration of GRS in "Product 11B", obtained using the same method described in Example 1 and thermo-gravimetric analysis (TGA), proved to be equal to 0.35% by weight.

Example 12

Example 1 was repeated but using 2 parts of graphite SFG6, 10 parts of styrene and 88 parts of glycerol (Carlo Erba). The product extracted after the treatment was placed in a closed and transparent container. After days, the suspension thus obtained proved to be homogeneous. The concentration of GRS in the product proved to be equal to 0.4% by weight.

Comparative Example 2

Example 1 was repeated but using 2 parts of graphite SFG6 and 98 parts of N-methyl-pyrrolidone (Carlo Erba), instead of styrene.

At the end of the treatment, the solution is extracted into a transparent container. After 1 hour, the solution in the container proved to be completely separated into two phases, wherein substantially all of the graphite material was deposited on the bottom.

Comparative Example 3

Example 1 was repeated but using 2 parts of graphite SFG6 and 98 parts of ethylbenzene instead of styrene.

At the end of the treatment, the solution is extracted into a transparent container. After 1 hour, the solution in the container proved to be completely separated into two phases, wherein substantially all of the graphite material was deposited on the bottom.

Example 13

Batch Node 2 parts of commercial synthetic graphite SFG6 produced by Timcal are dispersed in 98 parts of styrene (Sigma Aldrich) by means of a magnetic anchor stirrer at room temperature for 15 minutes, so as to obtain a homogeneous dispersion of graphite in the liquid. The composition is loaded into the receiving device (1) (FIG. 1) at room temperature, filling the whole volume available, and removing the gas previously contained in the same container from a nozzle positioned on the upper flange (f3). The composition is also passed, by means of stream (f1 bis), from the container (1) into the siphon (1 bis) to remove the gas present in the same. The siphon (1 bis) is then connected to an Argon cylinder whose reducer is set at bar absolute. In this way the container (1) is pressurized at the same pressure, at the same time preventing the Argon from entering the container (1).

In addition to allowing the pressurization, the same connection also allows the pressure to be kept constant during the whole ultrasound treatment process (by absorbing, for example, the thermal expansions).

After pressurization, the composition is subjected to ultrasounds, in batch mode, by means of a sonotrode at a frequency of 20 kHz and with a specific power of about 200 W/cm³. This power is modulated in time, in cycles of 10 seconds every 60 seconds, so that the resulting duty cycle is 17%.

The sonotrode is immersed directly in the receiving device (1) containing the composition to be treated. The receiving device (1) is equipped with a jacket inside which an oil circulates for heating the composition. In this way, during treatment, the composition, initially at room temperature, is heated at a rate of 55° C./hour, until it is brought to a maximum temperature of 130° C.

The treatment lasts 2 hours, at the end of which the material is collected directly from the bottom of the receiving device and left to rest in order to observe whether there is sedimentation of the graphite material.

Also in this case, the composition collected proved to be stable and homogeneous even after one month.

Example 14

This example describes the preparation of expandable polystyrene containing GRS.

48.48 parts of polystyrene Edistir N1782, 1.8 parts of Emerald 3,000 (sold by Chemtura; polymeric, brominated flame-retardant), 0.22 parts of Perkadox 30 and 50 parts of "Product 1D" obtained in Example 6, are mixed in a twin-screw extruder. 5 parts of a mixture of n-pentane (75%) and isopentane (25%) are then added. The composition thus prepared is mixed by means of a series of static mixers; a gear pump increases the pressure of the mixture up to 200 barg. The mixture is subsequently cooled to about 170° C. by means of a heat exchanger.

The composition is then sent to a heated die plate, where it is extruded through a number of holes having a diameter of 0.5 mm and immediately cooled by means of a water jet and cut by means of a series of rotating knives (as indicated, for example, in patent U.S. Pat. No. 7,320,585). The pressure in the granulation chamber is relative bar and the cutting rate is set so as to obtain granules having an average diameter of 1.2 mm. The granules are dried by means of a centrifuge drier and subsequently covered with a coating as described hereunder.

The granules are subjected to thermo-gravimetric analysis by means of the method described in Example 1 and a value of GRS equal to 0.45% by weight was obtained.

The coating is prepared by adding 3 parts of glyceryl monostearate to the granules, together with 1 part of zinc stearate and 0.2 parts of glycerol per 1,000 parts of dried granules. The additives of the coating are mixed with the granules by means of a continuous screw mixer.

The product thus coated is expanded at 17 g/l (bulk density) by means of vapour at a temperature of 100° C., left to age for 24 hours and finally used for the moulding of blocks (1040×1030×550 mm).

The blocks were cut to prepare flat sheets on which thermal conductivity measurements were effected. The measured thermal conductivity was equal to 31 mW/mK.

Some of the sheets obtained from the same blocks were placed in an oven at 70° C. for 2 days and test-samples were then obtained having dimensions of 9×19×2 cm. These test-samples were subjected to the fire-resistance test according to the standard DIN 4102. The samples passed the test.

The samples were also subjected to mechanical compression strength tests according to the standard EN ISO 844.

The strain at 10% compression proved to be equal to 113 kPa.

Comparative Example 4

This example describes the preparation of expandable polystyrene containing graphite.

The expandable polystyrene foam was prepared according to the procedures described in Example 14 but substituting the 50 parts of "Product 1D" with 0.5 parts of graphite SFG6, not subjected to any ultrasound treatment, and 49.5 parts of Edistir N 1782 (N1782 therefore reaches a total of 97.98 parts). The granules are dried by means of a centrifuge drier and subsequently covered by a coating as described in Example 14.

The granules were subjected to thermo-gravimetric analysis using the method described in Example 1 and a GRS value equal to 0.45% by weight was obtained.

Test-samples were prepared for the thermal conductivity, compression strength and fire-resistance measurements, as indicated in Example 14.

The results obtained are 33 mW/mK for the thermal conductivity and 108 kPa for the strain at 10% compression. The fire-resistance test was passed.

Example 15

Example 1 is repeated but using the scheme in FIG. 9. The pressurization is effected by means of expansion fluid contained in the pressurization tank (8). The pressure used in the sonication loop was equal to 12 barg.

Said expansion fluid consists of styrene, argon is used as pressurization gas.

The flow-rate of the composition fed from the storage tank (11) to the sonication loop is equal to 1% of the flow-rate of the recirculation pump (4), and is regulated using an additional gear pump (13), positioned between (11) and (1) with rate regulation by means of a frequency convertor.

A small part of the fluid contained in the sonication loop is periodically removed from the highest point of the same (point d, in FIG. 9) and is collected in the drainage tank (9).

A part of the sonicated fluid is collected from the sonication loop and sent to the decanter (10). As the pressure of the sonication loop is kept constant at 12 barg, the flow-rate of the fluid sent to (10) is substantially equal to the flow-rate of the composition fed from the storage tank (11) to the sonication loop.

The useful volume of the decanter (10) is such as to ensure a residence time of the composition in the decanter equal to 90 minutes. The pressure of the decanter is kept at 0.5 bar lower than the pressure of the sonication loop.

The flow-rate of supernatant sent from the decanter (10) to the concentrator (12) is equal to 10% of the flow-rate fed from (11) to the sonication loop. The remaining amount is removed from the bottom of the decanter (10) and recycled back to the storage tank (11).

The concentrator (12) is maintained at a pressure of 100 mbar absolute. The pressure is regulated by condensing the gases collected in (e) by means of a heat exchanger and eliminating the incondensable gases with a vacuum pump.

Nitrogen is introduced from the bottom of the concentrator (12) to effect the stripping of the volatile solvent (not shown in FIG. 9).

The composition leaving the concentrator (f15) was subjected to VOS, obtaining a value of solids equal to 40%. The thermo-gravimetric analysis effected according to the method described above on the solid product obtained from VOS, provided a value equal to 3.2%. This shows that the concentration of GRS leaving the concentrator was equal to about 1.3%.

Example 16

Example 1 is repeated, but before starting the ultrasounds, the exchanger (6) is used for bringing the solution to 60° C. in 30 minutes. The ultrasounds are then started as in Example 1.

The overall duration of the sonication treatment is minutes. The heating is equal to 1.5 degrees per minute for the first 40 minutes, then about 1 degree per minute for the subsequent 30 minutes, then about 0.5 degrees per minute for the last 20 minutes, until a temperature of 160° C. is reached at the end of the test.

After the first 50 minutes from the beginning of the sonication, the upper vent valve is opened again for a few seconds, in order to evacuate the gas possibly entrapped in the circuit.

Again following Example 1, "Product 16A" was obtained after decanting, "Product 16B" after centrifugation and "Product 16C" after stripping. The concentration of GRS in "Product 16B" was obtained using the same method described in Example 1 and thermo-gravimetric analysis (TGA); the result is 5.5 g/l. The solid fraction proved to be equal to 30%.

Comparative Example 5

This example describes ultrasound treatment according to an indirect mode (ultrasonic bath) in the presence of gas.

2 parts of commercial synthetic graphite SFG6 produced by Timcal, are dispersed in 98 parts of styrene (Sigma Aldrich) by means of a magnetic anchor stirrer, at room temperature for 15 minutes, so as to obtain a homogeneous dispersion of graphite in the liquid. The dispersion is introduced into a beaker inside an ultrasonic bath (Branson 8210 model), and then in contact with atmospheric air. The ultrasounds are then started. After a time equal to 2 hours of treatment, a first sample is collected. After a further hours of treatment, a second sample is collected. Both samples are left to rest. The day after, the graphite material in both samples proved to be completely deposited on the bottom.

Comparative Example 6

Example 8 is repeated but without charging the expansion fluid and without effecting the extraction of the gas pockets from the valves on streams (a), (b) and (d). Consequently, during the ultrasound treatment the gas is entrained by the pump (4) into the sonication chamber, where it comes into direct contact with the composition. After 2 hours of treatment, a sample is extracted and left to rest in a beaker. The day after, the graphite material in the beaker proved to be completely deposited on the bottom.

Example 17

This example describes ultrasound treatment according to the ultrasound emission modulation mode.

Example 1 is repeated but modulating the emission of ultrasounds with time, i.e. periodically varying the ultrasound power emitted. More specifically, periods of 15 minutes are alternated, in which the ultrasounds are emitted at a constant power, with periods of 5 minutes in which the emission of ultrasounds is interrupted (zero power). The actual duration remains unchanged (72 seconds), and therefore the total duration of the test is 9600 seconds.

"Product 17A" was obtained after decanting, "Product 17B" after centrifugation and "Product 16C" after stripping, analogously to what is described in Example 1. The "Product 17B" was subjected to TEM analysis; it was estimated by means of AFM that the GRS has a thickness not exceeding 10 nm. The concentration of GRS in "Product 17B" was obtained using the same method described in Example 1 and thermo-gravimetric analysis (TGA); the result is 5 g/l.

Example 18

Example 1 is repeated but using a longer overall treatment time (and therefore a longer actual sonication time). The overall time is equal to 28,800 seconds (8 hours); as the duty cycle is equal to 1%, the actual sonication time is equal to 288 seconds.

The test is carried out at a constant pressure, starting from room temperature (20° C.) and increasing the temperature by about 2 degrees per minute for the first 30 minutes, followed by about 1 degree per minute for the subsequent 30 minutes, then about 0.5 degrees per minute for the following 20 minutes, until a temperature of 120° C. is reached after 80 minutes from the beginning of the test. The temperature is then kept constant and regulated at 120° C. for the remaining time of the test. "Product 18A" was obtained after decanting, "Product 18B" after centrifugation and "Product 18C" after stripping, analogously to what is described in Example 1. The "Product 18B" was subjected to TEM and AFM analysis and also in this case a thickness of GRS not exceeding 10 nm can be estimated. The concentration of GRS in "Product 18B" was obtained using the same method described in Example 1 and thermo-gravimetric analysis (TGA); the result is 0.26% by weight, i.e. about 2.6 g/l. The solid fraction proved to be equal to 30%.

Analysis of the samples obtained with the examples described above with respect to sedimentation.

A sample of all the products of the examples according to the invention and comparative examples is positioned downstream of the preparation in a closed transparent container.

The samples of all the examples according to the invention indicated above, show a stable dispersion, i.e. even illuminating the sample with a bright light (e.g. flash Nikon Speedlight SB-80DX set at maximum intensity), no sedimentation of the product can be seen, either in the photographic image obtained, or even less, visually. The product appears uniformly opaque and dark. This property is maintained even after a month.

The samples of the comparative examples, on the contrary, initially show a uniform distribution but after not more than a day, a strong sedimentation of the product can be observed.

The stable dispersion indicates that a good exfoliation of the graphite material has been obtained. The samples deriving from the examples therefore show a good dispersion and exfoliation of the graphite material in GRS, whereas the samples of the comparative examples show a poor dispersion and exfoliation.

In particular, when carrying out the treatment at atmospheric pressure (Comparative Example 1), it can be observed, already an hour after the collection of the sample that the graphite material has settled, indicating that the method claimed by the present invention is generally not effective at atmospheric pressure. This distinguishes the present invention from the majority of processes known in the art, which, on the contrary, are carried out at atmospheric pressure.

In literature (see, for example the already cited article of Hernandez et al. "High-yield production of graphene by liquid-phase exfoliation of graphite", Nat. Nanotechnol. 2008, 3, 563-568), as already mentioned, the use of solvents such as N-methyl-pyrrolidone is recommended for the exfoliation of graphite. Surprisingly, however, when using this solvent in the method disclosed with the present invention (Comparative Example 2), not only the exfoliation is not enhanced but, on the contrary, is clearly detrimental. Only a few minutes after withdrawal, in fact, the sample showed a clear sedimentation of the sonicated graphite material.

Comparative Example 3 also showed a rapid sedimentation of the product.

Surprisingly, the suspensions obtained are not only stable with time but also contain GRS in a much higher concentration than the products known in literature. Hernandez et al., for example, obtained a concentration of about 0.01 g/l in NMP by treating the dispersion with ultrasounds for 30 minutes. The concentration of GRS obtained in Example 1, on the contrary, is much higher. Higher concentrations were obtained, but using much higher sonication times. Khan et al., for example, obtained a concentration of about 1.2 g/l after a sonication treatment of 460 hours. For sonication times lower than 100 hours, the concentration proved to be always below 1 g/l.

As already specified, such a high sonication time is not only disadvantageous for industrial implementation, but can also easily cause defects in the exfoliated graphite material.

From a comparison between examples according to the invention and comparative examples, and with literature, it can therefore be concluded that the selection of the solvent and pressure at which the sonication treatment is effected, in addition to the other teachings indicated in the present invention, are fundamental for obtaining the result claimed, and that the surprising results disclosed with the present invention could not be envisaged by the known art.

Comparative examples 5 and 6 show that, without the removal of gas from the sonicated fluid, or in any case, if the composition treated is in contact with an overlying separated gaseous phase (atmospheric air), the results of the present invention cannot be obtained. In particular, comparative Example 5 shows that the same composition, treated in a traditional ultrasonic bath, does not lead to the results obtained with the present invention.

The invention claimed is:
1. A composition, comprising:
    a solvent having an interfacial tension different from that of graphite material and comprising 10 to 70% by weight of a polystyrene and 20 to 80% by weight of a styrene monomer, and
    graphene and graphene nanoplatelets (GRS) stably dispersed without any evident formations of deposits or separated phases for at least 30 days in the solvent in a mass concentration of 0.05 to 5% by weight,
wherein the composition is produced by a process comprising
    combining a graphite and a styrene monomer to form a mixture;
    subjecting the mixture to ultrasound treatment to exfoliate the graphite to graphene and to simultaneously polymerize the styrene monomer to form a polystyrene, and
    decanting or separating by centrifugation the produced mixture comprising the polystyrene, the exfoliated gra- phene, unpolymerized styrene and non-exfoliated graphite to remove the graphite not completely exfoliated, wherein the ultrasound treatment is conducted at a frequency spectrum ranging from 18 kHz to 20 kHz and an ultrasound power of 60 to 110 W/cm$^3$ in a degassed environment at a pressure of from 12 to 25 bar absolute and at a temperature ranging from 20° C. to 200° C. for 0.5 seconds to 5 minutes; and wherein the graphene and the graphene nanoplatelets have an average thickness higher than or equal to the thickness of a single graphene layer up to 50 nm, the thickness being measured on samples of graphene and graphene nanoplatelets deposited on a silicon wafer coated with silicon oxide, with intermittent contact atomic force microscopy, called AFM tapping mode.

2. The composition according to claim 1, wherein the graphene and the graphene nanoplatelets have a carbon/oxygen molar ratio of higher or equal to 10.

3. A polymer composite or a polymer nano-composite, comprising:

the composition according to claim 1.

4. An expandable polymer composite or a nano-composite, comprising:

the polymer composite or the polymer nano-composite according to claim 3 and at least one expanding agent.

\* \* \* \* \*